United States Patent
Leguay et al.

(10) Patent No.: US 11,034,439 B2
(45) Date of Patent: Jun. 15, 2021

(54) DUPLICATED HYDRAULIC CIRCUIT WITH PRESSURE REGULATION

(71) Applicant: AIRBUS HELICOPTERS, Marignane (FR)

(72) Inventors: Pascal Leguay, Alleins (FR); Jean-Yves Agresta, Saint Cyr sur Mer (FR); Arnaud Groll, Calas (FR)

(73) Assignee: AIRBUS HELICOPTERS, Marignane (FR)

( * ) Notice: Subject to any disclaimer, the term of this patent is extended or adjusted under 35 U.S.C. 154(b) by 951 days.

(21) Appl. No.: 15/630,332

(22) Filed: Jun. 22, 2017

(65) Prior Publication Data
US 2018/0002007 A1 Jan. 4, 2018

(30) Foreign Application Priority Data
Jun. 29, 2016 (FR) ...................................... 1601026

(51) Int. Cl.
*B64C 27/64* (2006.01)
*F04B 1/324* (2020.01)
(Continued)

(52) U.S. Cl.
CPC ................ *B64C 27/64* (2013.01); *F04B 1/14* (2013.01); *F04B 1/20* (2013.01); *F04B 1/295* (2013.01); *F04B 1/324* (2013.01); *F04B 23/06* (2013.01); *F04B 49/002* (2013.01); *F04B 49/08* (2013.01); *F15B 11/165* (2013.01); *F15B 18/00* (2013.01); *B64C 13/00* (2013.01); *B64C 27/32* (2013.01); *F15B 2211/20538* (2013.01);

(Continued)

(58) Field of Classification Search
CPC .. F04B 1/324; F04B 1/14; F04B 23/06; B24C 27/64
USPC ......................................................... 60/443
See application file for complete search history.

(56) References Cited

U.S. PATENT DOCUMENTS

| 5,155,996 A | 10/1992 | Tatsumi et al. |
| 7,984,670 B2 | 7/2011 | Sequera et al. |

(Continued)

FOREIGN PATENT DOCUMENTS

| EP | 0879968 | 11/1998 |
| EP | 1394445 | 3/2004 |

(Continued)

OTHER PUBLICATIONS

French Search Report for French Application No. FR 1601026, Completed by the French Patent Office on Mar. 6, 2017, 7 pages.

*Primary Examiner* — Thomas E Lazo
*Assistant Examiner* — Daniel S Collins
(74) *Attorney, Agent, or Firm* — Brooks Kushman P.C.

(57) ABSTRACT

The present invention relates to A device for supplying hydraulic power, the device comprising two hydraulic circuits jointly feeding multi-cylinder hydraulic power transmission means in which each cylinder is connected to a single one of the hydraulic circuits independently of the others. Each hydraulic circuit includes a hydraulic pressure and flow rate generator and a pressure control module controlling said hydraulic pressure and flow rate generator so as to regulate the pressure of said fluid flowing in said hydraulic circuit as a function of said pressure of said fluid flowing in each hydraulic circuit and possibly as a function of one or more parameters external to said device.

20 Claims, 7 Drawing Sheets

(51) Int. Cl.
*F04B 49/00* (2006.01)
*F04B 49/08* (2006.01)
*F04B 1/295* (2020.01)
*F15B 11/16* (2006.01)
*F04B 23/06* (2006.01)
*F04B 1/14* (2020.01)
*F15B 18/00* (2006.01)
*F04B 1/20* (2020.01)
*B64C 13/00* (2006.01)
*B64C 27/32* (2006.01)

(52) U.S. Cl.
CPC ............... *F15B 2211/20553* (2013.01); *F15B 2211/20576* (2013.01); *F15B 2211/253* (2013.01); *F15B 2211/50536* (2013.01); *F15B 2211/8757* (2013.01)

(56) References Cited

U.S. PATENT DOCUMENTS

| | | | |
|---|---|---|---|
| 8,677,885 B2* | 3/2014 | Lauffer | F15B 15/1409 91/510 |
| 9,670,940 B2 | 6/2017 | Marger et al. | |
| 2004/0099136 A1* | 5/2004 | Egelja | F01B 3/0032 92/12.2 |
| 2012/0090459 A1 | 4/2012 | Lauffer et al. | |
| 2015/0337813 A1* | 11/2015 | Iwanaji | F04B 1/324 417/222.1 |

FOREIGN PATENT DOCUMENTS

| | | |
|---|---|---|
| EP | 1978248 | 10/2008 |
| EP | 2944817 | 11/2015 |
| FR | 2916492 | 11/2008 |
| FR | 3019861 | 10/2015 |

* cited by examiner

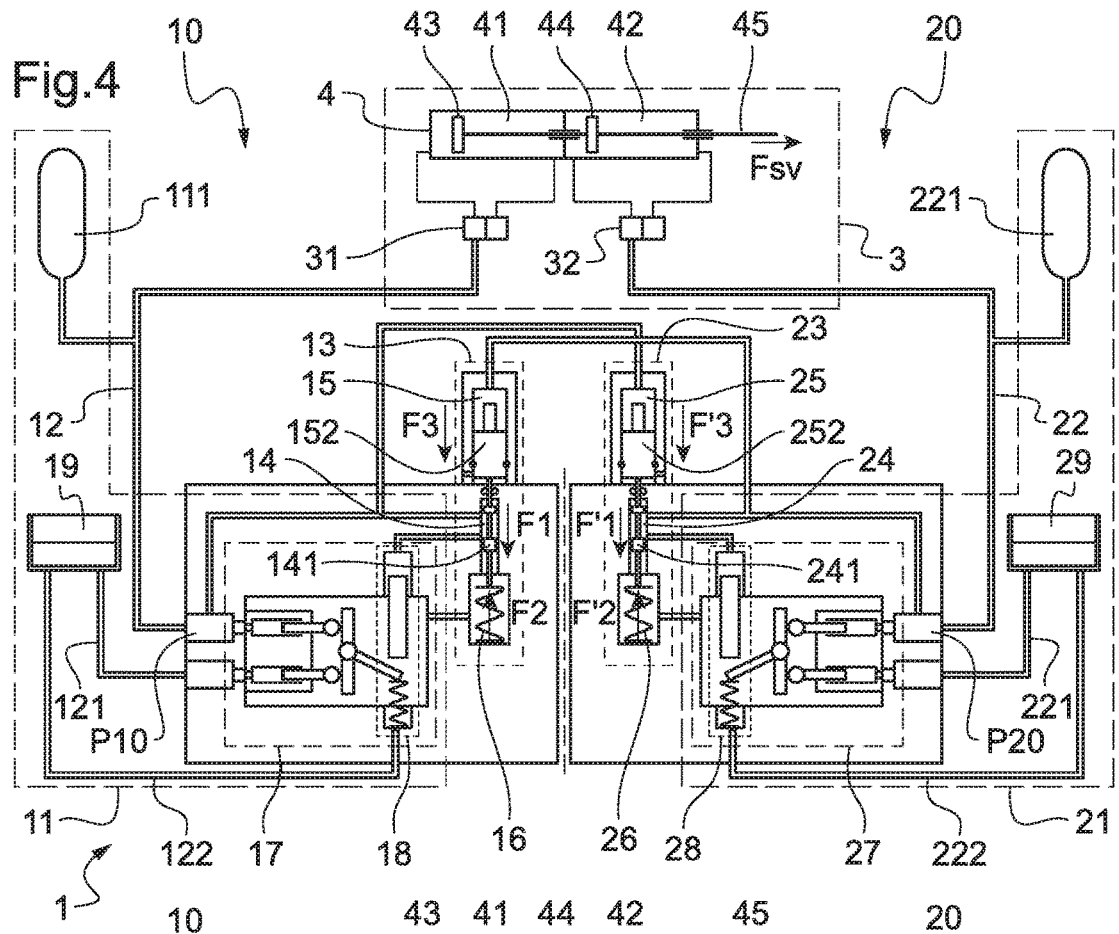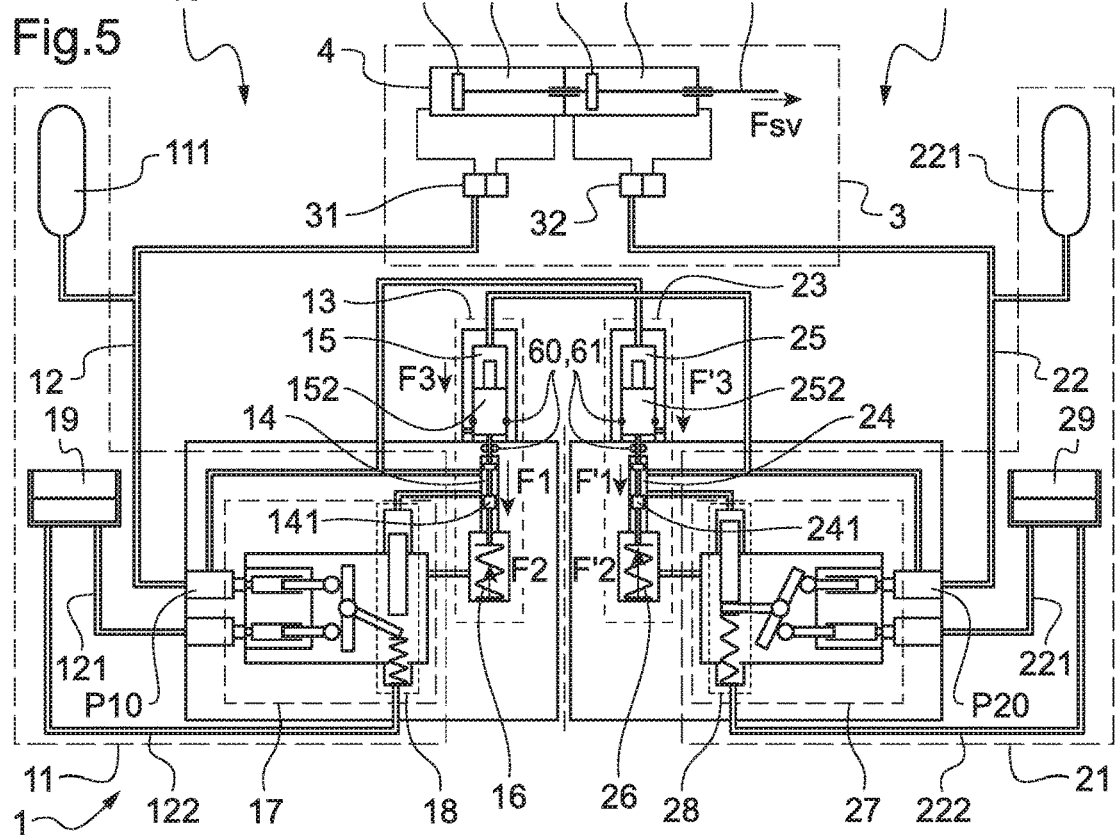

DUPLICATED HYDRAULIC CIRCUIT WITH PRESSURE REGULATION

CROSS-REFERENCE TO RELATED APPLICATIONS

This application claims priority to French patent application No. FR 16 01026 filed on Jun. 29, 2016, the disclosure of which is incorporated in its entirety by reference herein.

BACKGROUND OF THE INVENTION

(1) Field of the Invention

The present invention lies in the field of hydraulic equipment. The present invention relates to a hydraulic circuit for feeding at least one hydraulic receiver and to a hydraulic device including at least one hydraulic receiver and at least two hydraulic circuits for feeding each hydraulic receiver, each hydraulic circuit feeding a distinct chamber of each hydraulic receiver in independent manner. Such a hydraulic device is intended in particular for fitting to vehicles, and specifically to aircraft.

(2) Description of Related Art

A hydraulic device generally comprises a hydraulic circuit and one or more hydraulic receivers, the hydraulic circuit having as its main function feeding hydraulic receivers with hydraulic power that is characterized by a pressure and a flow rate of a fluid flowing in the hydraulic circuit.

A hydraulic receiver may be a servo or it may be a hydraulic motor, coupled to one or more hydraulic valves. A hydraulic receiver serves for example to amplify a manual command in order to produce a force necessary for implementing a mechanical operation. A servo is used in particular on vehicles and aircrafts, e.g. for the purpose of assisting a pilot in the face of the forces the pilot needs to supply in order to perform certain maneuvers. By way of example, a servo thus makes it possible to act on airfoils of an aircraft in order to move a flap of an airplane or indeed to modify the pitch of the blades of a rotor of a rotary wing aircraft. The hydraulic valves are jointly actuatable under the effect of a flight control operated by a pilot of the aircraft.

Generally, in order to ensure proper operation of such a hydraulic device and of its hydraulic receivers, an operating pressure is determined for the hydraulic circuit. This operating pressure is fixed and determined as a function of the needs of the hydraulic device over its entire operating range, e.g. by forces supplied by a servo. The operating pressure is used for the entire operating range of the hydraulic device and must therefore cover maximum requirements, e.g. the maximum forces to be supplied by the servo. Consequently, the operating pressure is the maximum operating pressure of the hydraulic device.

As a result, the hydraulic device is operated continuously at this maximum operating pressure, even though the maximum operating pressure is really necessary only during particular stages when the hydraulic device is used to the fullest. Outside such particular stages, an operating pressure lower than the maximum suffices to satisfy the needs of the hydraulic device.

Consequently, the hydraulic device consumes more energy than is necessary so as to be capable of supplying this maximum operating pressure on a continuous basis.

In addition, the use of this maximum operating pressure on a continuous basis leads to the components of the hydraulic device being subjected to high levels of stress, in particular concerning fatigue of the components, e.g. as characterized by pressure pulses. As a result, all of the components of the hydraulic device are designed to be capable of withstanding the maximum operating pressure on a permanent basis and are therefore overdimensioned with respect to the real needs of the hydraulic device.

Furthermore, the fluid is used continuously at this maximum operating pressure and can therefore be subjected to considerable heating. This considerable heating then requires the use of a heat exchanger in order to cool the fluid. The heat exchanger then increases the weight and the size of the hydraulic device, as well as its cost.

Furthermore, in order to guarantee reliability, a hydraulic device may have a plurality of hydraulic circuits. Thus, in the event of partial or total loss of hydraulic pressure in one of its hydraulic circuits, the other hydraulic circuit(s) still operating correctly enable(s) the hydraulic device to provide nominal operation.

A hydraulic device having a plurality of hydraulic circuits is used in particular in vehicles so as to ensure that a failure of any one hydraulic circuit does not prevent the vehicle from being operated. The use of a plurality of hydraulic circuits is essential in particular on board an aircraft in order to guarantee safety in flight and in order to ensure that such a failure does not lead to loss of control of the aircraft and to a crash.

A hydraulic device on board a vehicle, and in particular on board an aircraft, generally has two hydraulic circuits. The two hydraulic circuits are hydraulically independent, i.e. there is no possibility of fluid being exchanged between them, and they are also mechanically independent, i.e. the appearance of a crack, or indeed a break, in a part of one hydraulic circuit will not lead to a malfunction of the other hydraulic circuit. In particular, each hydraulic circuit has its own pipes and its own pump. By way of example, the pump may be a variable flow rate pump of flow rate that is automatically regulated and that includes a pressure regulator, or indeed a constant flow rate pump coupled to a pressure regulator.

The two hydraulic circuits then act together to feed two single-cylinder servos or indeed a two-cylinder or "duplex" servo. The use of two single-cylinder servos, or indeed of a two-cylinder servo, makes it possible to keep the two hydraulic circuits hydraulically independent of each other. Each single-cylinder servo, or indeed each cylinder of a two-cylinder servo, is fed with fluid by one of the hydraulic circuits and via a hydraulic valve that is actuated by a flight control if the vehicle is an aircraft. The powers of the two hydraulic circuits are then combined for feeding a servo and for moving a movable airfoil element of the aircraft, for example.

A multiple-cylinder servo suitable for varying the pitch of the blades of a rotor of a rotary wing aircraft is described in Document FR 2 916 492.

Furthermore, the hydraulic valves share the flow of fluid between the hydraulic circuits and the cylinders of a multicylinder servo in response to flight controls operated by a pilot of the aircraft. Such hydraulic valves are frequently integrated in the servos, but they can also be installed on the hydraulic circuits.

Nevertheless, in order to mitigate a failure of a hydraulic circuit, each hydraulic circuit is designed so as to be capable on its own of feeding the servo over the entire flight envelope of the aircraft using the hydraulic device. Specifically, as mentioned above, each hydraulic circuit operates continuously with the maximum operating pressure of the hydraulic device.

This maximum operating pressure is in fact necessary for a hydraulic circuit only during particular stages, such as turning with a high load factor on board a rotary wing aircraft, since during such stages the hydraulic device is stressed to a maximum, particularly when only one hydraulic circuit is in operation. As a result, when both hydraulic circuits are operating correctly, the hydraulic device consumes twice as much energy as is really required for these particular stages in order to be able to accommodate a failure of one of the hydraulic circuits.

Outside such particular stages, an operating pressure lower than the maximum operating pressure suffices to satisfy the needs of the hydraulic device. Consequently, the hydraulic device then consumes energy that is much greater than its real needs, since each hydraulic circuit makes continuous use of the maximum operating pressure, which is itself greater than the operating pressure that is needed.

In addition, and as mentioned above, this continuous use of the maximum operating pressure in each hydraulic circuit leads to considerable heating of the fluid, thereby requiring a heat exchanger to be used for each hydraulic circuit. In addition, the use of this maximum operating pressure on a continuous basis leads to high levels of stress on the components of each of the hydraulic circuits, particularly in terms of fatigue stress, and leads to the components of each of the hydraulic circuits being overdimensioned compared with the real needs of the hydraulic device.

Furthermore, Document U.S. Pat. No. 5,155,996 describes a hydraulic control unit having a motor driving a variable flow rate hydraulic pump, at least one hydraulic actuator, a valve controlling the flow rate of the fluid feeding the hydraulic actuator in compliance with an operating criterion, control means regulating the flow rate of the pump in compliance with that operating criterion, and control means controlling the saturation of the flow rate of the hydraulic pump. Those control means measure a pressure difference between the fluid leaving the pump and the fluid feeding the actuator, and they act on the motor when the pressure difference is less than a predetermined value in order to avoid saturating the hydraulic pump.

Furthermore, Document EP 2 944 817 describes a hydraulic circuit that includes in particular a variable flow rate pump, a constant flow rate pump, and a regulator device for regulating the flow rate of the variable flow rate pump. The regulator device has two regulator means formed by valves and hydraulic actuators fed by the fluid flowing in the control device for controlling the valves, together with two power control springs associated with the variable flow rate pump.

The technological background of the field of the invention also includes the following documents: US 2012/090459, EP 0 879 968, EP 1 978 248, and EP 1 394 445. In particular, Document EP 1 394 445 describes a device for controlling the hydraulic pressure of continuously variable transmission means. That control device has a single hydraulic circuit for feeding the two pulleys of that transmission and two pressures, that may be different.

BRIEF SUMMARY OF THE INVENTION

An object of the present invention is to provide a hydraulic circuit for feeding a hydraulic receiver and making it possible to overcome the above-mentioned limitations, in particular by limiting the pressure in the hydraulic circuit to a setpoint pressure corresponding to the needs of the circuit in order to reduce energy consumption considerably.

The present invention also provides a hydraulic power supply device having at least two hydraulic circuits and at least one hydraulic receiver, the device enabling the operating pressure to be used in each hydraulic circuit while supplying the pressure needed for the operation of each hydraulic receiver.

According to the invention, a hydraulic circuit is for feeding at least one hydraulic receiver. The hydraulic circuit comprises:

a fluid;

a hydraulic pressure and flow rate generator for that fluid; and pipes for connecting the hydraulic pressure and flow rate generator with each hydraulic receiver.

A hydraulic receiver may comprise hydraulic power transmission means and at least one valve controlling fluid feed to the hydraulic power transmission means as a function of a control order.

The hydraulic circuit of the invention is remarkable in that it includes a pressure control module controlling the hydraulic pressure and flow rate generator to regulate the pressure of the fluid flowing in the hydraulic circuit as a function of said pressure of the fluid flowing in the hydraulic circuit and as a function of one or more parameters that are external to the hydraulic circuit so that the pressure of the fluid flowing in the hydraulic circuit is equal to a setpoint pressure.

By way of example, a first hydraulic pressure and flow rate generator comprises a tank containing the fluid, a variable flow rate pump of flow rate that is automatically regulated, and that is provided with a pressure regulator, and pipes that are constituted firstly by feed pipes connecting the variable flow rate pump with the tank, and secondly by tank return pipes connecting the pressure regulator to the tank. The pressure control module controls the pressure regulator so as to adapt the flow rate of the variable flow rate pump and thereby regulate the pressure of the fluid flowing in the hydraulic circuit. The tank return pipe serves to return fluid to the tank.

A second hydraulic pressure and flow rate generator has a tank containing the fluid, a constant flow rate pump, and pipes. These pipes are constituted firstly by feed pipes connecting the constant flow rate pump to the tank and secondly by tank return pipes connecting the pressure control module to the tank. The pressure control module then modifies a return flow rate to the tank of the fluid flowing in the tank return pipe in order to regulate the pressure of the fluid flowing in the hydraulic circuit.

By way of example, a parameter external to the hydraulic circuit whereby the pressure control module controls the hydraulic pressure and flow rate generator may be selected from a list comprising:

a second pressure of a second fluid flowing in another hydraulic circuit;

an operating characteristic of a hydraulic receiver fed by the hydraulic circuit; and an order to modify the setpoint pressure.

The pressure control module includes a first hydraulic actuator controlled by the pressure of the fluid flowing in the hydraulic circuit, at least one second actuator controlled by one or more parameters external to the hydraulic circuit, and calibration means. By way of example, the first hydraulic actuator, each second actuator, and the calibration means may present movements that are linear. The first hydraulic actuator, each second actuator, and the calibration means may be arranged in series, e.g. axially one after another.

The first hydraulic actuator includes a first movable element to which the pressure of the fluid flowing in the hydraulic circuit is applied at least in part in order to generate a first force F1. By way of example, the first hydraulic actuator is a piston and cylinder actuator and the first movable element is formed by a rod and a piston. The movement of the first movable element serves to control the regulation of the hydraulic pressure and flow rate generator.

This first force F1 is opposed by a second force F2 generated by the calibration means. The calibration means preferably comprise resilient means, e.g. a spring working in compression.

Each second actuator may act on the first actuator either directly, or else indirectly via the calibration means. Each second actuator may then drive a movement of the first movable element of the first actuator.

In a first embodiment of the hydraulic circuit of the invention, a second actuator serves to act on the first actuator. The second actuator is preferably force controlled in order to generate a third force F3. Nevertheless, the second actuator could be movement controlled, using an appropriate control relationship.

In a first variant, the second actuator applies the third force F3 directly on the first movable element of the first actuator. The first force F1 is then a function only of the pressure of the fluid flowing in the hydraulic circuit. As a result, the third force F3 is added to the first force F1. Thus, the second force F2 generated by the calibration means opposes the sum of the first force F1 plus the third force F3. This sum of the first force F1 plus the third force F3 may be referred to as a regulation force.

In a second variant, the second actuator under the action of a non-zero third force F3 serves to modify the pressure of the fluid acting on the first movable element of the first actuator. As a result, the first force F1 is then a function of the pressure of the fluid flowing in the second hydraulic circuit and of the third force F3. Consequently, the second force F2 generated by the calibration means opposes this first force F1. The first force F1 then constitutes the regulation force. The pressure of the fluid acting on the first movable element is then different from the pressure of the fluid flowing in the hydraulic circuit when the third force F3 is not zero.

Whatever the variant of this first embodiment, when the second actuator does not generate any action on the first actuator, the third force F3 is then zero. Consequently, the regulation force is equal to a first force F1 generated solely by the pressure of the fluid flowing in the hydraulic circuit.

As a result, when the pressure of the fluid flowing in the hydraulic circuit is equal to the setpoint pressure, the regulation force opposes the second force F2 and is equal to a calibration force. The first movable element of the first actuator does not move. The pressure control module acts on the hydraulic pressure and fluid flow rate generator so as to keep this pressure of the fluid flowing in the hydraulic circuit constant and equal to the setpoint pressure.

When the pressure of the fluid flowing in the hydraulic circuit is different from the setpoint pressure, the regulation force continues to oppose the second force F2 and is different from the calibration force. The first movable element of the first actuator is moved, and the pressure control module acts on the hydraulic pressure and flow rate generator to modify the pressure of the fluid flowing in the hydraulic circuit so that it becomes equal to the setpoint pressure. When the pressure of the fluid flowing in the hydraulic circuit varies, the first force F1 also varies, thereby leading to a modification of the regulation force of the second force F2, and consequently to a movement of the first movable element. When the pressure of the fluid flowing in the hydraulic circuit reaches the setpoint pressure, the regulation force is then equal to the calibration force. The position of the first movable element is then stabilized and the pressure control module then acts on the hydraulic pressure and flow rate generator so as to keep this pressure of the fluid flowing in the hydraulic circuit constant and equal to the setpoint pressure.

When the third force F3 is zero and the pressure of the fluid flowing in the hydraulic circuit is equal to the setpoint pressure, the second force F2 is equal to the calibration force and opposes the first force F1 generated solely by the pressure of the fluid flowing in the hydraulic circuit. The calibration force is thus a function of a calibration setting of the calibration means. When the third force F3 is not zero and the pressure of the fluid flowing in the hydraulic circuit is equal to the setpoint pressure, the second force F2 is also equal to the calibration force and opposes the first force F1 and the third force F3. This calibration force is then a function of the calibration setting of the calibration means and a function of the third force F3. The term "calibration setting" is used to designate the pre-setting of the calibration means corresponding to a predetermined setpoint pressure. This calibration setting may for example be a prestress level or a compression level of resilient means constituting the calibration means, such as a compression spring, for example. The calibration setting may be expressed as a compression percentage for the resilient means or indeed as a force percentage generated by the resilient means.

In addition, when the third force F3 generated by the second actuator varies, the regulation force also varies, and the balance within the pressure control module is modified. Specifically, this variation of the third force F3 is accompanied by a movement of the first movable element of the first actuator, and consequently by a variation in the pressure of the fluid flowing in the hydraulic circuit. This variation in pressure leads to a modification of the first force F1 and of the second force F2, but does not modify the third force F3. Consequently, the pressure of the fluid flowing in the hydraulic circuit stabilizes at a value corresponding to a new setpoint pressure. In conclusion, a variation of the third force F3 leads to a modification of the setpoint pressure of the hydraulic circuit. This new setpoint pressure is then kept constant so long as the third force F3 remains unchanged.

This new setpoint pressure is associated with a new calibration force of the calibration means. Consequently, the third force F3 makes it possible to modify the setpoint pressure, and as a result the calibration force.

Furthermore, when the hydraulic circuit is operating normally, i.e. when it has not suffered any failure, the third force F3 is preferably strictly less than the first force F1. This relationship between the first force F1 and the third force F3 enables the hydraulic circuit to conserve higher authority over the pressure of the fluid compared with parameters external to the hydraulic circuit. For example, the ratio between the first force F1 and the third force F3 may be about 1.3.

In a second embodiment of the hydraulic circuit of the invention, a second actuator acts directly on the calibration means in order to modify its calibration setting, and consequently the calibration force. The second actuator is preferably movement controlled so as to deform the calibration means and thus modify its calibration setting. Nevertheless, the second actuator could be force controlled, using an appropriate control relationship.

A variation in the calibration setting of the calibration means enables the calibration force to be modified and consequently enables the setpoint pressure of the hydraulic circuit to be modified.

Specifically, after such modifications to the calibration setting and to the calibration force, the pressure of the fluid flowing in the hydraulic circuit, which was previously equal to the setpoint pressure, is now different from the new setpoint pressure. Furthermore, the second force F2 of the calibration means is modified as a result of the modification of the calibration setting, and the first movable element of the first actuator thus moves. The regulation force still opposes the second force F2 but is different from the new calibration force. The pressure control module acts on the hydraulic pressure and flow rate generator in order to modify the pressure of the fluid flowing in the hydraulic circuit so that it approaches the new setpoint pressure and becomes equal to the new setpoint pressure.

When the pressure of the fluid flowing in the hydraulic circuit varies, the first force F1 also varies, thereby modifying the regulation force, and consequently the second force F2. When the pressure of the fluid flowing in the hydraulic circuit reaches the new setpoint pressure, the regulation force opposes the second force F2, which is then equal to the calibration force. The position of the first movable element of the first actuator is then stabilized and the pressure control module then acts on the hydraulic pressure and flow rate generator so as to keep this pressure for the fluid flowing in the hydraulic circuit constant and equal to the new setpoint pressure.

Consequently, whatever the embodiment of the hydraulic circuit of the invention, the second actuator thus advantageously serves to modify the setpoint pressure of the hydraulic circuit and the calibration force of the calibration means.

A third embodiment of the hydraulic circuit of the invention combines these first and second embodiments. The pressure control module then has two second actuators, a first second actuator acting on the first actuator and a second second actuator acting directly on the calibration means.

Thus, whatever the embodiment of the hydraulic circuit of the invention, the second actuator serves advantageously to modify the setpoint pressure as a function of one or more parameters so that the hydraulic circuit supplies a pressure for the fluid that is adapted to the needs of a hydraulic receiver.

By way of example, a second actuator is a hydraulic actuator fed by a fluid external to the hydraulic circuit. The second actuator is then connected to a hydraulic system external to the hydraulic circuit by a pipe of the hydraulic circuit in which there flows the fluid external to the hydraulic circuit. By way of example, this fluid external to the hydraulic circuit flows in another hydraulic circuit operating in parallel with the hydraulic circuit of the invention.

By way of example, a second hydraulic actuator is used for the first embodiment of the invention and is preferably force controlled. The setpoint pressure with which the first pressure of a first fluid flowing in a first hydraulic circuit needs to comply may then be modified depending on the second pressure of a second fluid flowing in a second hydraulic circuit that is independent of the first hydraulic circuit.

Likewise, a second actuator is an electric actuator controlled by a control signal corresponding to one or more parameters external to the hydraulic circuit. The hydraulic circuit then has an electrical connection connecting the second actuator to a control device external to the hydraulic circuit and in which the control signal passes.

By way of example, a second actuator that is electric is used for the second embodiment of the invention and is preferably movement controlled. The setpoint pressure that the first pressure of a first fluid flowing in a first hydraulic circuit needs to comply with can thus be modified depending on a control signal corresponding to the second pressure of a second fluid flowing in a second hydraulic circuit independent of the first hydraulic circuit, this second hydraulic circuit including a pressure sensor constituting the control device.

The control device may also be a computer supplying a control signal. The setpoint pressure may also be modified in compliance with a control signal corresponding to an operating characteristic of a hydraulic receiver fed by the first hydraulic circuit, or indeed corresponding to an order to modify the setpoint pressure.

Furthermore, each second actuator may include one or more braking and damping means acting on the movement of a piston so as to stabilize the operation of the pressure control module, in particular when the second actuator is a hydraulic actuator. Braking and damping means may in particular serve to avoid sudden movements and/or inappropriate movements of movable components of the second actuator, which might possibly be caused by the effects of strong vibration, for example, thereby preserving the second actuator from premature wear, as described in Document FR 3 019 861. Such braking and damping means may also make it possible to avoid modifying the setpoint pressure during small variations of the pressure of a fluid feeding the second actuator.

For simplification purposes, in the description below, such braking and damping means are referred to as "damping" means. Damping means may comprise sealing means providing friction along a movable component of the second actuator when it moves axially. Damping means may also involve using a certain amount of free travel for the second actuator.

By way of example, such damping means characterize a pressure threshold applied to the second fluid external to the hydraulic circuit in order to limit the effects of the second fluid on the modification to the setpoint pressure.

Damping means may also serve to filter dynamic variation in the second pressure of the second fluid feeding the second actuator. For example, such damping means may comprise a constriction zone, i.e. a local reduction in the diameter of a pipe, serving to attenuate rapid variations in the second pressure of the second fluid, i.e. variations at high frequency, while not blocking low frequency variations of the second pressure of the second fluid, which can then act on the setpoint pressure of the fluid flowing in the hydraulic circuit.

In addition, the hydraulic pressure and flow rate generator of each hydraulic circuit may include one or more fluid accumulators that constitute a hydraulic power reserve. An accumulator serves mainly to manage transient stages in the operation of a hydraulic receiver fed by the hydraulic circuit. Thus, in the event of a sudden large need for power by a hydraulic receiver fed by the hydraulic circuit, an accumulator can supply a flow of fluid into the hydraulic circuit. This sudden and large need for power may correspond for example to starting a hydraulic receiver, such as extending landing gear of an aircraft, for example.

When the second actuator of the pressure control module is electric, such a sudden large need for power may be anticipated by previously increasing the setpoint pressure so as do enable the power available at each hydraulic receiver fed by the hydraulic circuit to be increased.

The present invention also provides a hydraulic power supply device including at least one hydraulic receiver and at least two hydraulic circuits. The hydraulic circuits are as specified above and they feed each hydraulic receiver with fluid under pressure.

A hydraulic receiver may include multi-cylinder hydraulic power transmission means having a plurality of cylinders and of valves. A valve is connected to only one hydraulic circuit. A hydraulic circuit thus feeds one of the cylinders of the multi-cylinder hydraulic power transmission means via one valve independently of every other hydraulic circuit. Multi-cylinder hydraulic power transmission means are thus powered jointly by a plurality of hydraulic circuits.

The hydraulic valves are jointly actuatable under the effect of a control signal, e.g. coming from a flight control actuated by a pilot of the aircraft including the hydraulic power supply device for the purpose of regulating simultaneously the flow of fluid in each hydraulic circuit and of respectively feeding the various cylinders of the multi-cylinder hydraulic power transmission means.

Specifically, the pressure of the fluid flowing in each hydraulic circuit acts on a respective one of the cylinders of the multi-cylinder hydraulic power transmission means. The hydraulic power transmission means can thus supply an operating force that is a function of the pressure of the fluid flowing in each hydraulic circuit. This operating force is equal to the sum of the forces available at each cylinder of the multi-cylinder hydraulic power transmission means. Advantageously, this operating force available to the multi-cylinder hydraulic power transmission means is equal to a setpoint force Fc. The setpoint pressure of each hydraulic circuit is then defined as a function of the setpoint force Fc of the multi-cylinder hydraulic power transmission means.

The pressure of each hydraulic circuit is thus regulated and adapted so that the operating force applied by the hydraulic power transmission means is equal to the setpoint force Fc. For example, a drop of a first pressure of a first fluid flowing in a first hydraulic circuit is compensated by an increase of a second pressure of a second hydraulic fluid in a second hydraulic circuit of the hydraulic power supply device.

By way of example, multi-cylinder hydraulic power transmission means may comprise a multi-cylinder servo, the valves possibly being integrated in the servo. It is also possible for multi-cylinder hydraulic power transmission means to be a servo or indeed a multi-cylinder actuator.

Multi-cylinder hydraulic power transmission means may equally well be replaced by a plurality of single-cylinder hydraulic power transmission means, each single-cylinder hydraulic power transmission means being fed by a single hydraulic circuit independently of every other hydraulic circuit via a respective valve.

The hydraulic power transmission means may comprise means for controlling a movable airfoil element of an aircraft, such as a flap situated on a wing, a movable rudder, or indeed a blade of a rotor, for example. Under such circumstances, a parameter external to a first hydraulic circuit and serving to control a second actuator of the first hydraulic circuit may be selected from a list comprising:

the second pressure of a second fluid flowing in a second hydraulic circuit of the hydraulic power supply device;
a type of mission being undertaken by the aircraft;
a region of a flight envelope of the aircraft;
an action of a pilot of the aircraft on a flight control of the aircraft;
a control order of the pilot seeking to modify the setpoint pressure; and parameter external to the aircraft and likely to vary, such as the temperature outside the aircraft and atmospheric pressure, for example.

In addition, the second actuator of a first hydraulic circuit may equally well be controlled by a parameter that is internal to the first hydraulic circuit and that might vary, such as the temperature or the volume level of the fluid flowing in the first hydraulic circuit, for example.

The setpoint force Fc may be constant and equal to a maximum force that the hydraulic power transmission means is to supply in its operating range plus a safety margin. The safety margin guarantees that the multi-cylinder hydraulic power transmission means can always supply an operating force that is greater than or equal to needs. By way of example, this safety margin may be about 10% to 20% of the maximum force to be supplied by the hydraulic power transmission means.

Advantageously, the pressure of the fluid flowing in each hydraulic circuit is regulated to comply with this constant setpoint force Fc and is capable of covering the entire flight envelope of the aircraft when the hydraulic power supply device is used by way of example to control an airfoil element of the aircraft, while limiting the pressure in each hydraulic circuit. The pressure of the fluid flowing in each hydraulic circuit is thus regulated as a function of the pressure of the fluid flowing in the hydraulic circuit and in every other hydraulic circuit of the hydraulic power supply device so that the operating force applied by the hydraulic power transmission means is equal to the setpoint force Fc.

Consequently, the hydraulic power supply device consumes considerably less energy while still guaranteeing sufficient hydraulic power to cover the entire operating range of each hydraulic receiver.

The setpoint force Fc may also be variable and equal to a current force that the hydraulic power transmission means needs to be capable of supplying, plus a safety margin.

Advantageously, the pressure of each hydraulic circuit is regulated in compliance with this variable setpoint force Fc, thus enabling the hydraulic power supply device to supply hydraulic power that is just sufficient and thereby optimize its energy consumption. The setpoint pressure of each hydraulic circuit is then modified depending on the current needs of each hydraulic receiver of the device, and thus depending on variation of the setpoint force Fc. The pressure of each hydraulic circuit is then regulated so as to comply with the corresponding setpoint pressure.

The setpoint force Fc may thus be modified depending on the type of mission being undertaken by the aircraft, or indeed on the region of a flight envelope in which it is operating. For example, for a rotary wing aircraft, while hovering, while deck landing, or while turning in flight with a high load factor, the need for power to change the pitch of the blades of the main rotor of the aircraft is large. As a result, the setpoint force Fc increases, and consequently the setpoint pressure of each hydraulic circuit also increases. Likewise, during a rescue mission or while winching, the setpoint force Fc is increased in order to anticipate and mitigate weather difficulties or indeed to perform maneuvers rapidly. In contrast, during cruising flight at a stabilized speed, the need for power is low. As a result, the setpoint force Fc can be decreased, and consequently the setpoint pressure of each hydraulic circuit can likewise be decreased.

The setpoint force Fc may also be modified in anticipation depending on actions of the pilot of the aircraft on a fight control of the aircraft and in order to ensure that sufficient power is available for performing the maneuver that the pilot is engaging.

A specific action of the pilot may modify the setpoint force Fc in order to anticipate a difficult maneuver, such as takeoff or landing on a platform, for example, and/or in order to be ready to cope with unexpected events during a maneuver, or indeed with difficult weather conditions.

Regulating the pressures of the fluids flowing in the hydraulic circuits becomes more complex when the setpoint force Fc is variable than when it is constant, but the energy savings and consequently the fuel savings for an aircraft are greater. Specifically, the setpoint force Fc needs to be determined continuously as a function of the operation of each hydraulic receiver. Furthermore, regulation relationships taking this variable setpoint force Fc into account need to be used in order to determine the setpoint pressure of each hydraulic circuit.

When the setpoint force Fc is variable, the second actuator is preferably an electric actuator. This electric second actuator is controlled by a control signal representative of a single parameter external to the hydraulic power supply device or indeed of a combination of a plurality of such parameters. This or these parameters then characterize the setpoint force Fc and variations thereof.

Furthermore, whether the setpoint force Fc is constant or variable, the pressure of the fluid flowing in each hydraulic circuit is generally greatly reduced compared with a hydraulic circuit as used conventionally. In the invention, this pressure becomes equivalent to that which is used conventionally in a hydraulic circuit only when there is only a single hydraulic circuit of the hydraulic power supply device of the invention that is in operation, with the pressure in every other hydraulic circuit being zero or very low as a result of a failure.

As a result, the static pressure stresses on each hydraulic receiver and on the components of each hydraulic circuit, as defined by the maximum pressure of the fluid flowing in each hydraulic circuit, remain unchanged relative to those to which a hydraulic device is conventionally subjected. In contrast, fatigue stresses are considerably reduced compared with those to which a hydraulic device is conventionally subjected. Consequently, the lifetimes of each hydraulic receiver and of the components of each hydraulic circuit are considerably lengthened. Likewise, their maintenance costs may be decreased.

Furthermore, the fluid in each hydraulic circuit, by being used substantially continuously at a lower pressure, is subjected to heating that is much less than the fluid used conventionally in a hydraulic device. As a result, the dimensions and consequently the weight of the heat exchangers that are conventionally used for cooling the fluid can be smaller, and indeed the use of such heat exchangers may even be eliminated if the reduction in the heating allows that.

Advantageously, the hydraulic circuits are segregated both hydraulically and mechanically. Thus, the hydraulic circuits are isolated from each other, preventing any exchange of fluid between them. Furthermore, since the hydraulic circuits are then structurally distinct, any mechanical weakness or failure of a component in one hydraulic circuit does not affect another hydraulic circuit. This structural distinction between the hydraulic circuits makes it possible to preserve each hydraulic circuit from cracks in a component from one hydraulic circuit propagating to another hydraulic circuit, thus avoiding a simultaneous failure of a plurality of hydraulic circuits. By way of example, such cracks may be the result of external stresses to which the hydraulic circuits are subjected and more particularly of high levels of vibration when the hydraulic power supply device is fitted to an aircraft.

Furthermore, when a second actuator of the pressure control module of a first hydraulic circuit is a hydraulic actuator fed by a second hydraulic circuit of the hydraulic power supply device, the second actuator may include at least one damping means. By way of example, damping means characterize a pressure threshold applied to the second pressure of a second fluid flowing in the second hydraulic circuit in order to limit the effects of the second fluid on modification to the setpoint pressure of the first fluid flowing in the first hydraulic circuit. For example, no force F3 is applied to the movable first element of the first actuator so long as the second pressure of the second hydraulic circuit is less than the pressure threshold.

BRIEF DESCRIPTION OF THE DRAWINGS

The invention and its advantages appear in greater detail from the context of the following description of embodiments given by way of example and with reference to the accompanying figures, in which:

FIGS. 2 to 9 show various embodiments of such a hydraulic power supply device.

Elements present in more than one of the figures are given the same references in each of them.

DETAILED DESCRIPTION OF THE INVENTION

Figure 1:
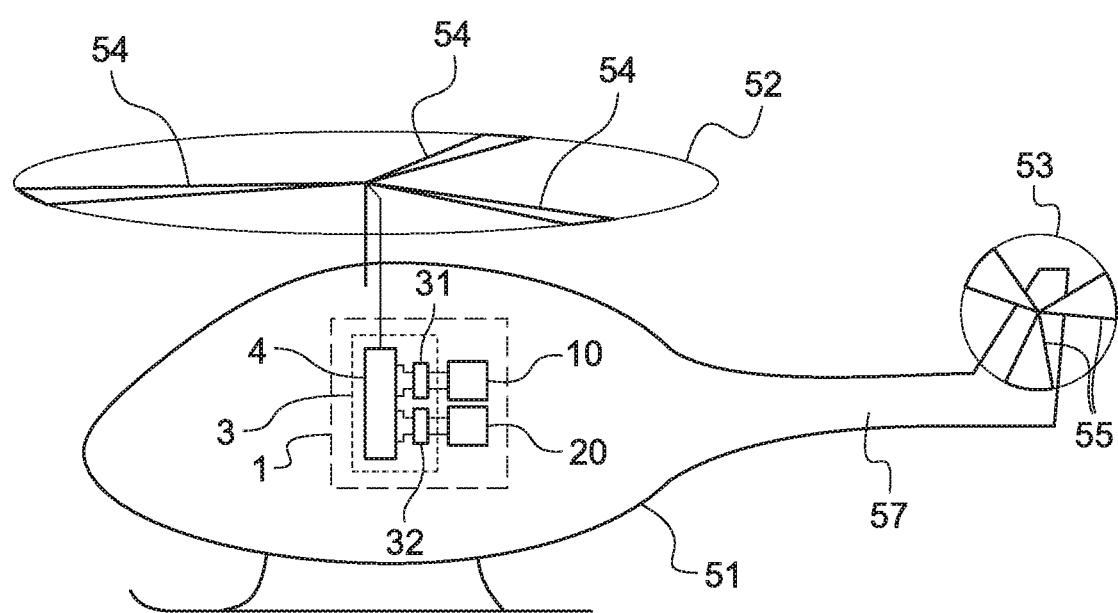
FIG. 1 shows a rotary wing aircraft having a hydraulic power supply device of the invention.

FIG. 1 shows a rotary wing aircraft 50 comprising a fuselage 51 and a tail boom 57 fastened at a first end to the fuselage 51. The rotary wing aircraft 50 also has a main rotor 52 arranged above the fuselage 51 and provided with main blades 54, together with an anti-torque secondary rotor 53 arranged at a second end of the tail boom 57 and provided with secondary blades 55. The main blades 54 and the secondary blades 55 constitute movable airfoil elements of the aircraft 50. Finally, the aircraft 50 has a hydraulic power supply device 1 provided with two hydraulic circuits 10 and 20 and with a hydraulic receiver 3. The hydraulic receiver 3 has two valves 31 and 32, and control means 4 for controlling the pitch of the main blades 54 so as to modify their pitch.

Various examples of hydraulic power supply devices 1 are shown in FIGS. 2 to 9.

In common manner, these hydraulic power supply devices 1 have one hydraulic receiver 3 and two hydraulic circuits 10 and 20 jointly feeding the hydraulic receiver 3 with fluid under pressure. Each hydraulic circuit 10, 20 comprises a generator 11, 21 of hydraulic pressure and flow rate in a fluid, pipes 12, 22 and a pressure control module 13, 23. The pipes 12, 22 connect the hydraulic pressure and flow generator 11, 21 to the hydraulic receiver 3 and they feed it with fluid under pressure.

The pressure control module 13, 23 of a first hydraulic circuit 10, 20 controls the hydraulic pressure and flow rate generator 11, 12 of the first hydraulic circuit 10, 20 in order to regulate the pressure of the fluid flowing in the first hydraulic circuit 10, 20 as a function of the pressure of the fluid flowing in this first hydraulic circuit 10, 20 and of one or more parameters external to the first hydraulic circuit 10, 20 so that the pressure of the fluid flowing in the first hydraulic circuit 10, 20 is equal to a setpoint pressure.

The hydraulic receiver 3 has two valves 31, 32 and control means 4 serving to modify the pitch of the main blades 54 of the main rotor 52. Each valve 31, 32 is connected to a hydraulic circuit 10, 20 and controls the feed of fluid to the control means 4 as a function of a control order. By way of example, the control order may come from a flight control present in the aircraft 50 and operated by a pilot.

The control means 4 comprise two-cylinder hydraulic power transmission means, such as a duplex servo. Each valve 31, 32 feeds a single cylinder 41, 42 of the control means 4. Both of the valves 31, 32 are controlled simultaneously and the two cylinders 41, 42 are fed simultaneously by the two hydraulic circuits 10 and 20 so as to cause an operating force $F_{SV}$ to appear on the rod 45 of the control means 4. The operating force $F_{SV}$ serves to modify the pitch of the main blades 54. This operating force $F_{SV}$ is a function firstly of the pressure $P_{10}$, $P_{20}$ of the fluid flowing respectively in each hydraulic circuit 10, 20 and of the surface area $S_{43}$, $S_{44}$ of a piston 43, 44 arranged respectively in each cylinder 41, 42 and secured to the rod 45. It is thus possible to write:

$$F_{SV}=P_{10}\cdot S_{43}+P_{20}\cdot S_{44}$$

Furthermore, this operating force $F_{SV}$ is equal to a setpoint force Fc in order to guarantee that this operating force $F_{SV}$ is greater than or equal to the force needed to change the pitch of the main blades 54. Consequently, the setpoint pressures $Pc_{10}$, $Pc_{20}$ of the fluids flowing respectively in each hydraulic circuit 10, 20 are determined as a function of the setpoint force Fc that the control means 4 is to supply and a function of the surface areas $S_{43}$, $S_{44}$. These setpoint pressures $Pc_{10}$, $Pc_{20}$ are thus defined by the following relationship:

$$F_{SV}=Pc_{10}\cdot S_{43}+Pc_{20}\cdot S_{44}$$

Figure 2:
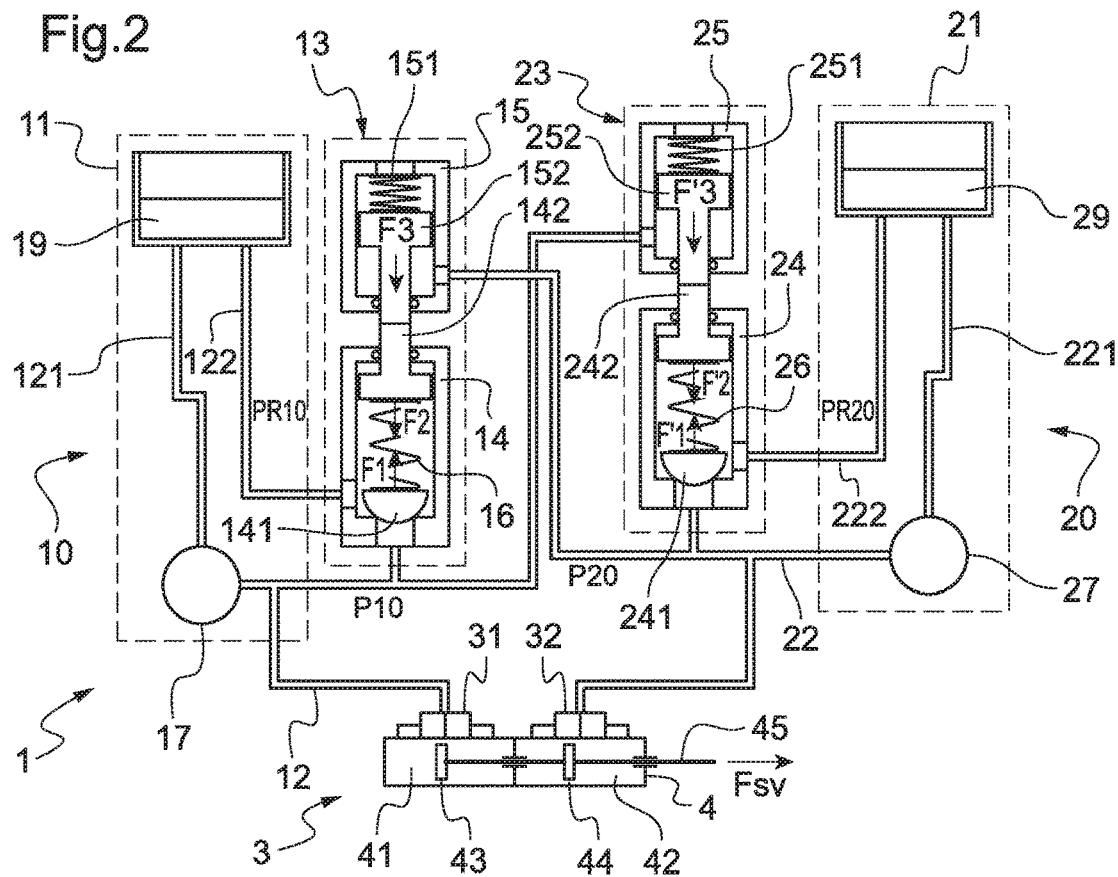
Figure 3:
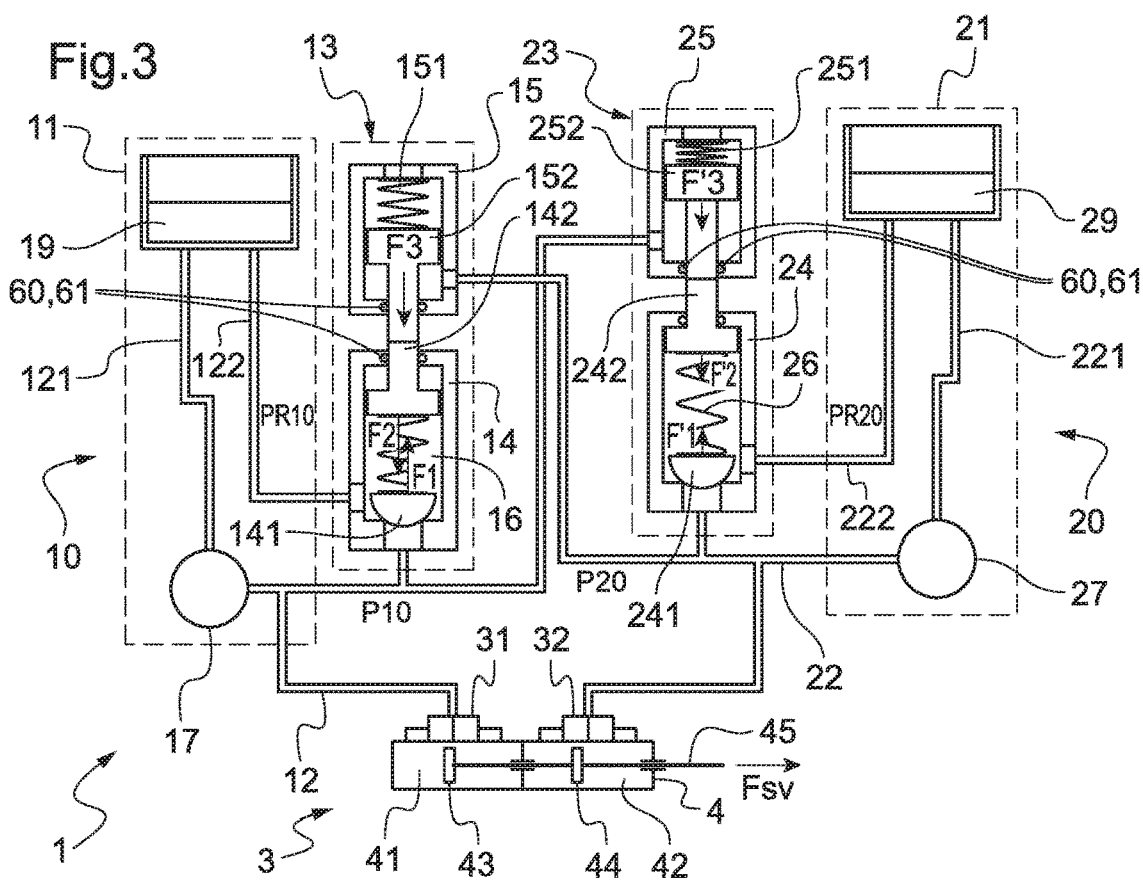

Furthermore, the valves 31 and 32 may be integrated in the control means 4 as shown in FIGS. 2 and 3 or else they may be distinct from the control means 4, as shown in FIGS. 4 to 9.

The two hydraulic circuits 10 and 20 are independent. The hydraulic circuits 10 and 20 have their own respective fluid tanks 19, 29 respectively feeding distinct cylinders 41 and 42 of the control means 4 via different valves 31, 32. No fluid exchange takes place between the two hydraulic circuits 10, 20.

Figure 8:
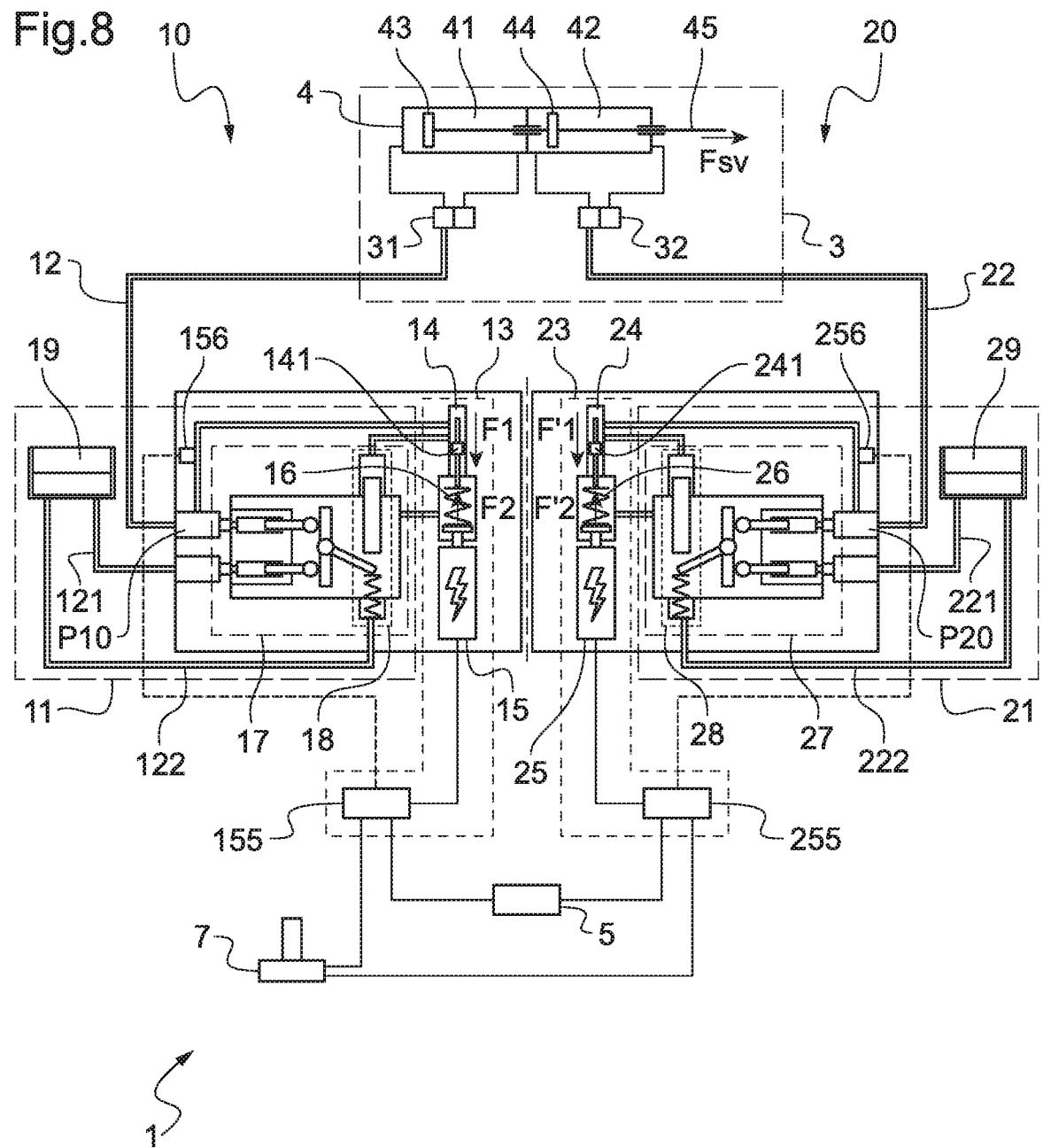
Figure 9:
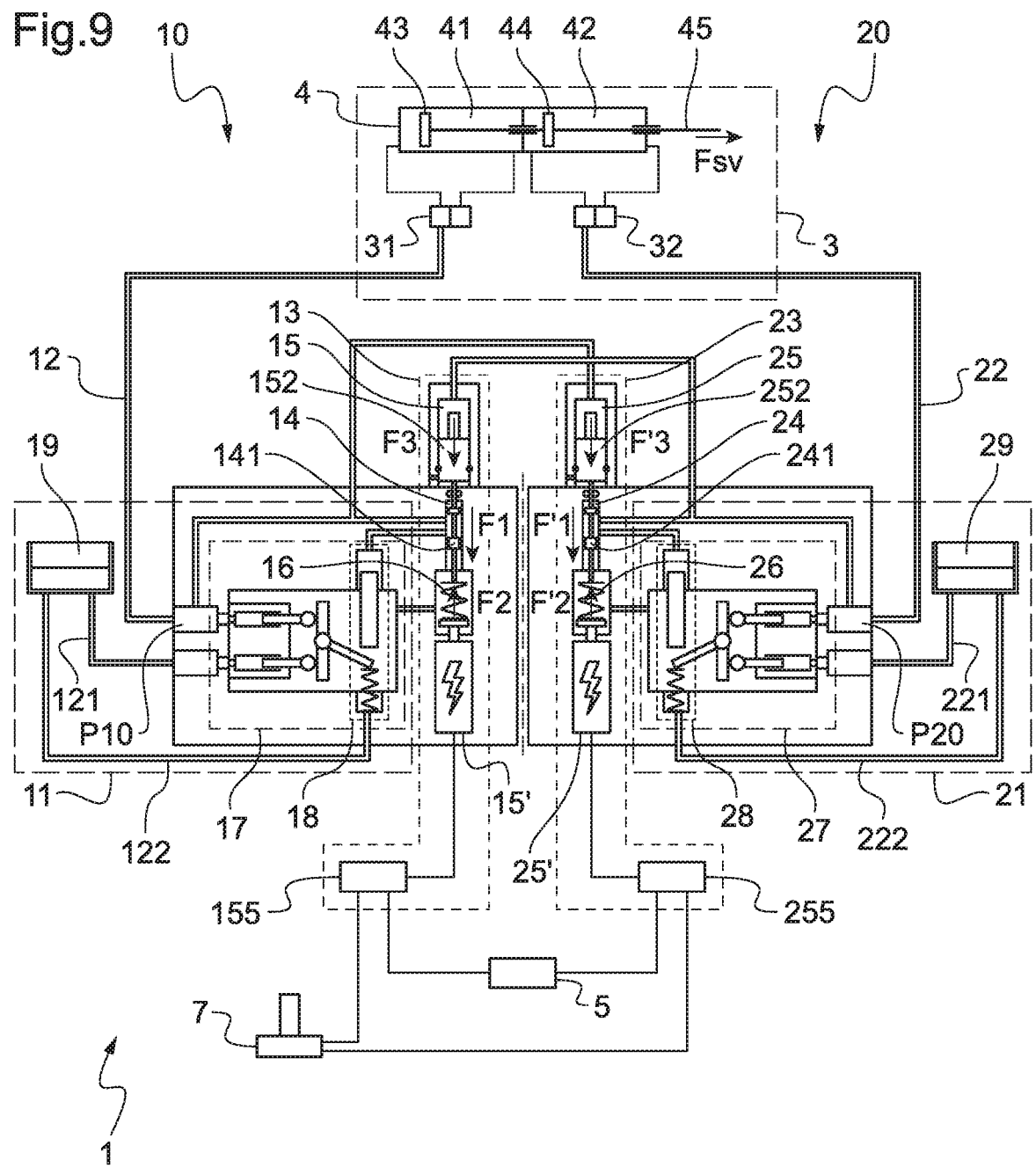

A first embodiment of a hydraulic power supply device 1 is shown in FIGS. 2 to 7. A second embodiment of the device 1 is shown in FIG. 8. A third embodiment of such a device 1 is shown in FIG. 9, which combines the first and second embodiments.

Figure 6:
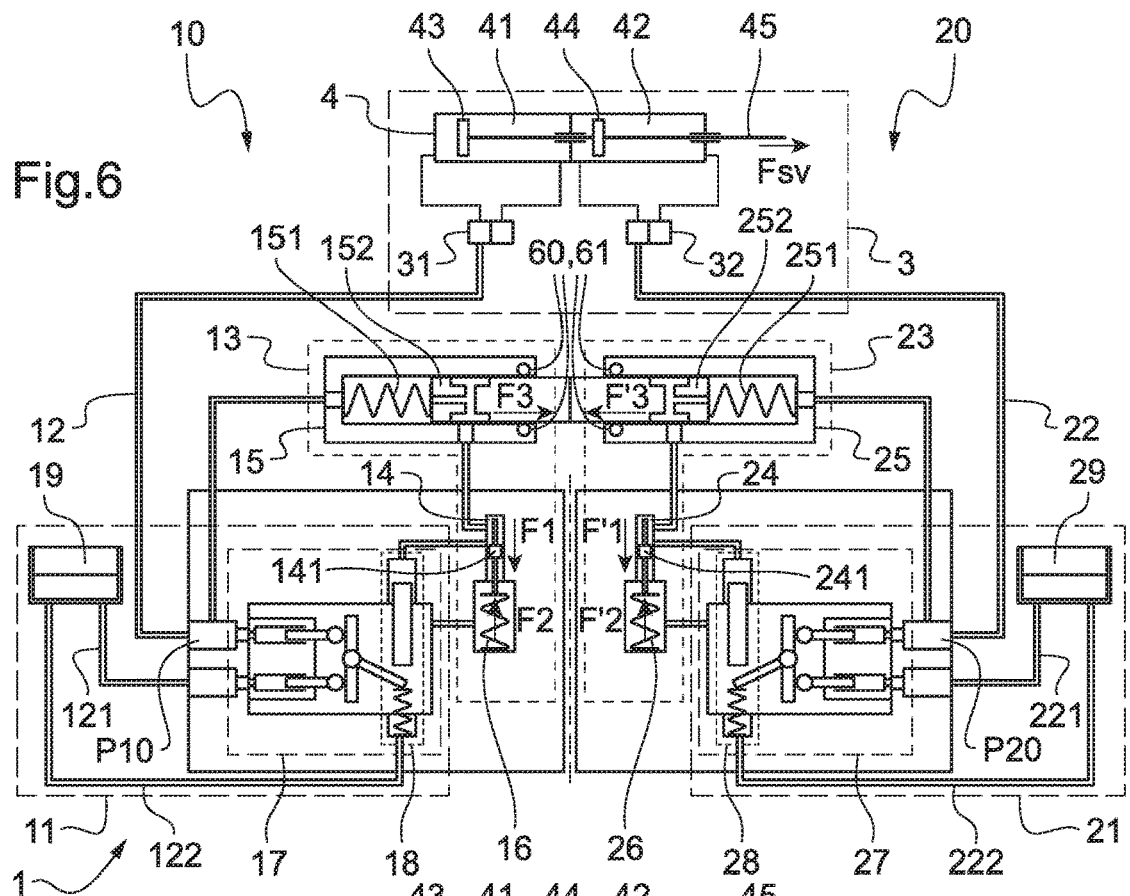
Figure 7:
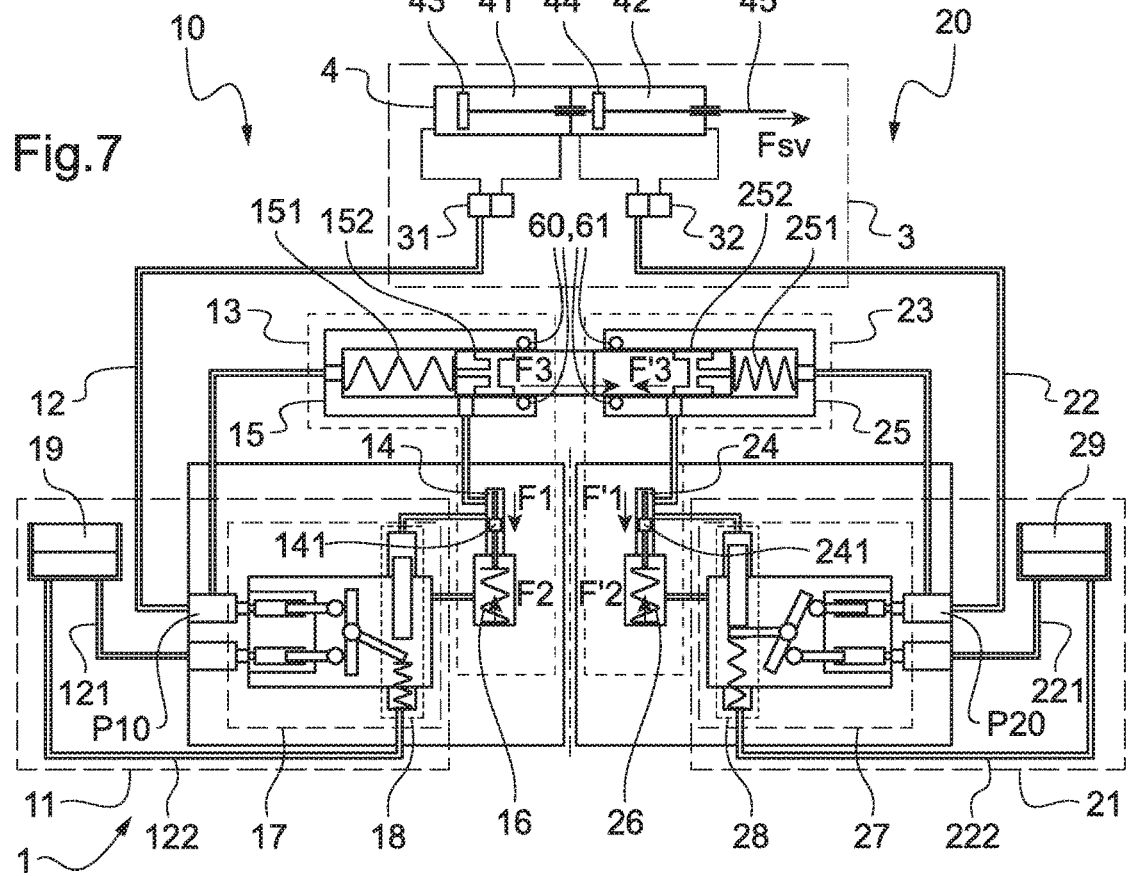

The first embodiment of a hydraulic power supply device 1 has two variants that are shown respectively in FIGS. 2 to 5 and in FIGS. 6 and 7.

Whatever the embodiment, the pressure control module 13, 23 of each hydraulic circuit 10, 20 has a first hydraulic actuator 14, 24 controlled at least in part as a function of the pressure of the fluid flowing in the hydraulic circuit 10, 20, at least one second actuator 15, 25, and calibration means 16, 26.

Within a hydraulic power supply device 1, the first actuators 14, 24 of two hydraulic circuits 10, 20 are identical, as are the second actuators 15, 25, the calibration means 16, 26, and the hydraulic pressure and flow rate generators 11, 21.

The first actuator 14, 24 has a first movable element 141, 241 on which the pressure of the fluid flowing in the hydraulic circuit 10, 20 to which the first actuator 14, 24 belongs is applied, at least in part. A first force F1 is thus generated on the first movable element 141, 241. A second force F2 generated by the calibration means 16, 26 opposes this first force F1. The calibration means 16, 26 comprise resilient means constituted by a spring working in compression.

In the first embodiment, each first actuator 14, 24 is fed solely with the fluid flowing in the hydraulic circuit 10, 20 to which the first hydraulic actuator 14, 24 belongs. The first force F1 generated by a first actuator 14, 24 thus makes it possible to characterize the pressure of the fluid flowing in the hydraulic circuit 10, 20 to which the first actuator 14, 24 belongs.

Furthermore, each pressure control module 13, 23 has a single second hydraulic actuator 15, 25 fed with the fluid flowing in one of the two hydraulic circuits 10, 20. The second actuator 15, 25 has a second movable element 152, 252 on which the pressure of this fluid feeding the second actuator 15, 25 is applied.

In a first variant of the first embodiment, the second hydraulic actuator 15, 25 is fed with the fluid flowing in the other hydraulic circuit 10, 20 to which the second actuator 15, 25 does not belong.

A first example of the first variant of this first embodiment is shown in FIGS. 2 and 3. Each hydraulic pressure and flow rate generator 11, 21 comprises a tank 19, 29 containing the fluid, a constant flow rate pump 17, 27, and pipes. These pipes are constituted firstly by feed pipes 121, 221 connecting the constant flow rate pump 17, 27 to the tank 19, 29, and secondly tank return pipes 122, 222 connecting the pressure control module 13, 23 to the tank 19, 29. The pressure control module 13, 23 of this hydraulic circuit 10, 20 then modifies the return flow rate of the tank 19, 29 of the fluid flowing in the tank return pipe 122, 222 in order to regulate the pressure of the fluid flowing in the hydraulic circuit 10, 20.

The constant flow rate pumps 17, 27 are identical and they deliver the same fluid flow rate into each hydraulic circuit 10, 20.

Each second actuator 15, 25 includes a spring 151, 251 acting on the second movable element 152, 252 and opposing the action of the fluid feeding the second actuator 15, 25. A third force F3 is then generated on each second movable element 152, 252, combining the actions of the spring 151, 251 and of the fluid feeding the second actuator 15, 25. The third force F3 serves to characterize the pressure of the fluid flowing in this other hydraulic circuit 10, 20.

The third force F3 acts on the calibration means 16, 26 that is integrated in the first actuator 14, 24 by means of an independent part 142, 242. The third force F3 thus serves to modify the calibration setting of the calibration means 16, 26 and thus modify the second force F2 applied by the calibration means 16, 26 on the first movable element 141, 241. This second force F2 is thus a function of the pressure of the fluid flowing in the other hydraulic circuit 10, 20 to which the second hydraulic actuator 15, 25 does not belong, and it opposes the first force F1.

The calibration setting corresponds to a prestress that is to be applied to the calibration means 16, 26.

The first movable element 141, 241 then acts as a valve member and enables the return flow rate of the fluid flowing in the tank return pipe 122, 222 leading to the tank 19, 29 to be modified as a function of the pressures of these fluids flowing in the two hydraulic circuits 10, 20. The first force F1 tends to cause the first movable element 141, 241 to move so as to increase this return flow rate, while the second force F2 tends to cause the first movable element 141, 241 to move so as to reduce this return flow rate.

Each pressure control module 13, 23 thus enables the pressure $P_{10}$, $P_{20}$ of the fluid flowing in a hydraulic circuit 10, 20 to be regulated as a function of the pressures $P_{10}$ and $P_{20}$ of the fluids flowing in the two hydraulic circuits 10 and 20.

When the pressures $P_{10}$, $P_{20}$ of the fluids flowing in the two hydraulic circuits 10, 20 are equal, as shown in FIG. 2, the first forces F3, F'3 applied to each second movable element 152, 252 are equal. Consequently, the second forces F2, F'2 generated respectively by the calibration means 16, 26 are likewise equal, as are the first forces F1, F'1 generated respectively on each first movable element 141, 241 and opposing the second forces F2, F'2.

Consequently, the movement of the first movable element 141, 241 of each hydraulic circuit 10, 20 balances the second force F2, F'2, which is equal to a calibration force of the calibration means 16, 26, with the pressure of the fluid of the hydraulic circuit 10, 20 and the first force F1, F'1. This movement of the first movable element 141, 241 is the same for each hydraulic circuit 10, 20. Consequently, the return flow rates of the fluid flowing respectively in the tank return pipes 122, 222 of the two hydraulic circuits 10, 20 are the same.

This operation of the hydraulic circuits 10, 20 with equal pressures $P_{20}$, $P_{20}$ for the fluids constitute nominal and balanced operation between the two hydraulic circuits 10, 20. These pressures $F_{10}$, $P_{20}$ of the fluid flowing in the two hydraulic circuits 10, 20 are equal to the setpoint pressures $Pc_{10}$, $Pc_{20}$. These setpoint pressures $Pc_{10}$, $Pc_{20}$ are characterized by a calibration force of each of the calibration means 16, 26.

Nevertheless, these setpoint pressures $Pc_{10}$, $Pc_{20}$ can be different for each hydraulic circuit 10, 20, in particular when the surface areas $S_{43}$, $S_{44}$ of the pistons 43, 44 arranged in the cylinders 41, 42 are different.

When one of the pressures $P_{20}$, $P_{20}$ decreases, e.g. the second pressure $P_{20}$, as a result of a malfunction of the second hydraulic circuit 20 as shown in FIG. 3, then the third force F3 applied to the second movable element 152 of the first hydraulic circuit 10 and generated by this second pressure $P_{20}$ increases. The calibration setting of the first calibration means 16 of the first hydraulic circuit 10 is then modified as a result of the increase of the third force F3 and of the second force F2, as generated by the first calibration means 16 then increases, as does the first force F1 opposing the second force F2.

Consequently, the first movable element 141 of the first hydraulic circuit 10 moves so as to reduce the return flow rate of the fluid flowing in the first hydraulic circuit 10 to the tank 19, 29 and to increase the first pressure $P_{10}$ of the fluid flowing in the first hydraulic circuit 10. This modification of the third force F3 thus leads to a modification of the first setpoint pressure $Pc_{10}$. The first pressure control module 13 of the first hydraulic circuit 10 thus controls the movement of the first movable element 141 and the return flow rate so that the first pressure $P_{10}$ is equal to a new first setpoint pressure $Pc_{10}$.

The increase in the first pressure $P_{10}$ then acts on the second actuator 25 of the second hydraulic circuit 20 and reduces the third force F'3 applied on the second movable element 252 of the second hydraulic circuit 20. Consequently, the calibration setting of the second calibration means 26 of the second hydraulic circuit 20 is modified as a result of the decrease in the third force F'3, and the second force F'2 as generated by the second calibration means 26 decreases, as does the first force F'1 opposing the second force F'2.

This decrease in the first force F'1 leads to a movement of the first movable element 241 of the second hydraulic circuit 20, and consequently to a modification of the second setpoint pressure $Pc_{20}$. The second pressure control module 23 of the second hydraulic circuit 20 thus controls movement of the second movable element 241 and reduces the return to the tank 19, 29 so that the second pressure $P_{20}$ of the fluid flowing in the second hydraulic circuit 20 becomes equal to the new second setpoint pressure $Pc_{20}$.

A second example of the first variant of this first embodiment is shown in FIGS. 4 and 5. The hydraulic pressure and flow rate generator 11, 21 comprises a tank 19, 29 containing the fluid, a variable flow rate pump 17, 27 of flow rate that is automatically regulated and provided with a pressure regulator 18, 28, and pipes. These pipes are constituted firstly by feed pipes 121, 221 connecting the variable flow rate pump 17, 27 with the tank 19, 29 and secondly by tank return pipes 122, 222 connecting the pressure regulator 18, 28 with the tank 19, 29. The pressure control module 13, 23 controls the pressure regulator 18, 28 so as to adapt the flow rate of the variable flow rate pump 17, 27 and thus regulates the pressure of the fluid flowing in the hydraulic circuit 10, 20, with the tank return pipes 122, 222 enabling the fluid to return to the tank 19, 29.

Furthermore, the hydraulic pressure and flow rate generator 11, 21 of each hydraulic circuit 10, 20 includes a fluid accumulator 111, 221 constituting a reserve of hydraulic power. Each accumulator 111, 221 serves in particular to respond to a large and rapid need for hydraulic power by supplying an additional flow of fluid in the hydraulic circuit 10, 20.

The position of the first movable element 141, 241 of each first actuator 14, 24 serves to control a pressure regulator 18, 28 by modifying the flow rate of fluid feeding the pressure regulator 18, 28.

A third force F3 is generated by the action of the fluid feeding the second actuator 15, 25 on the second movable element 152, 252 of the second actuator 15, 25, and characterizes the pressure of this fluid flowing in this other hydraulic circuit 10, 20. The third force F3 acts directly on the first movable element 141, 241 of the first actuator 14, 24.

The calibration means 16, 26 apply the second force F2 directly against the first movable element 141, 241 of the first actuator 14, 24. Consequently, the second force F2 opposes the sum of the first force F1 plus the third force F3. The third force F3 thus makes it possible via the first movable element 141, 241 to modify the position of the first movable element 141, 241, and consequently to modify the calibration setting of the calibration means 16, 26. This movement of the first movable element 141, 241 then acts on the pressure regulator 18, 28.

Each pressure control module 13, 23 thus enables the pressure $P_{10}$, $P_{20}$ of the fluid flowing in a hydraulic circuit 10, 20 to be regulated as a function of the pressures $P_{10}$, $P_{20}$ of the fluids flowing in the two hydraulic circuits 10, 20.

When the pressures $P_{10}$, $P_{20}$ of the fluids flowing in the two hydraulic circuits 10, 20 are equal, as shown in FIG. 4, the first forces F1, F'1 applied to each first movable element 141, 241 are equal, and the third forces F3, F'3 applied to each second movable element 152, 252 are equal. Consequently, the second forces F2, F'2 generated respectively by one of the calibration means 16, 26 and opposing the sum of the first and third forces F1, F'1, F'1, F3, F'3 are likewise equal.

Consequently, the first movable element 141, 241 of each hydraulic circuit 10, 20 controls a pressure regulator 18, 28 of a hydraulic pressure and flow rate generator 11, 21 in identical manner so as to maintain the pressure $P_{10}$, $P_{20}$ in each hydraulic circuit 10, 20 equal respectively to the setpoint pressure $Pc_{10}$, $Pc_{20}$.

As in the first example, this operation of the hydraulic circuits 10, 20 with equal pressures $P_{10}$, $P_{20}$ for the fluids constitute nominal and balance operation between the two hydraulic circuits 10, 20.

When one of the pressures $P_{10}$, $P_{20}$ decreases, e.g. the second pressure $P_{20}$ as a result of a malfunction of the second hydraulic circuit 20, as shown in FIG. 5, then the third force F3 applied to the second movable element 152 of the first hydraulic circuit 10 and generated by the second pressure $P_{20}$ of the fluid flowing in the second hydraulic circuit 20 decreases. Consequently, the sum of the first force F1 plus the third force F3 also decreases, as does the second force F2 generated by the first calibration means 16 and opposing this sum of the first force F1 plus the third force F3. The calibration setting of the first calibration means 16 of the first hydraulic circuit 10 is then modified as a result of the decrease in the third force F3.

Consequently, the first movable element 141 of the first hydraulic circuit 10 moves to act on the pressure regulator 18 and thus increases the first setpoint pressure $Pc_{10}$ so as to compensate for the drop in the second pressure $P_{20}$ of the fluid flowing in the second hydraulic circuit 20. This modification to the calibration setting of the first calibration means 16 thus leads to a modification of the first setpoint pressure $Pc_{10}$.

This increase in the first setpoint pressure $Pc_{10}$ leads to an increase in the first pressure $P_{10}$ of the fluid in the first hydraulic circuit 10, which then acts on the second actuator 25 of the second hydraulic circuit 20. The third force F'3 applied to the second movable element 252 of the second hydraulic circuit 20 increases, modifying the calibration setting of the second calibration means 26 of the second hydraulic circuit 20 so as to reduce the second setpoint pressure $Pc_{20}$.

Thus, for this first variant of this first embodiment, the setpoint pressures $Pc_{10}$, $Pc_{20}$ are modified as a function of the variations in the pressures $P_{10}$, $P_{20}$ of the fluids flowing in the two hydraulic circuits 10, 20, with a variation in the pressure $P_{10}$, $P_{20}$ in one hydraulic circuit 10, 20 being compensated by an opposite variation in the pressure $P_{10}$, $P_{20}$ in the other hydraulic circuit 10, 20. As a result, the pressures $P_{10}$, $P_{20}$ are regulated and adapted so that the operating force $F_{SV}$ supplied by the control means 4 is equal to the setpoint force Fc.

The setpoint pressures $Pc_{10}$, $Pc_{20}$ of the fluids flowing in the two hydraulic circuits 10, 20 are defined respectively by a calibration setting of the calibration means 16, 26 of each hydraulic circuit 10, 20 so that the operating force $F_{SV}$ supplied by the control means 4 is equal to the setpoint force Fc. As a result, variation of a pressure in one circuit leads to a change in the calibration settings of the calibration means 16, 26 and consequently to a modification in the setpoint pressures $Pc_{10}$, $Pc_{20}$.

Advantageously, these new setpoint pressures $Pc_{10}$, $Pc_{20}$ still enable the operating force $F_{SV}$ supplied by the control means 4 to be equal to the fluid force Fc.

A second variant of this first embodiment is shown in FIGS. 6 and 7. The hydraulic pressure and flow rate generator 11, 21 comprises a tank 19, 29, a variable flow rate pump 17, 27 of flow rate that is automatically regulated and provided with a pressure regulator 18, 28, together with feed pipes 121, 221, and tank return pipes 122, 222.

Each second hydraulic actuator 15, 25 is fed with the fluid flowing in the hydraulic circuit 10, 20 to which the second actuator 15, 25 belongs. Each second actuator 15, 25 includes a spring 151, 251 acting on the second movable element 152, 252 so that its action is added to that of the fluid feeding the second actuator 15, 25. A third force F3 is then generated on each second movable element 152, 252 by combining the actions of the springs 151, 251 and of the fluid feeding the second actuator 15, 25. The third force F3 thus serves to characterize the pressure of the fluid flowing in the hydraulic circuit 10, 20 to which the second actuator 15, 25 belongs.

The two second actuators 15, 25 are axially in alignment and the two second movable elements 152, 252 bear against each other while being structurally distinct. As a result, the third forces F3, F'3 of the second movable elements 152, 252 are applied reciprocally against the second movable element 152, 252 of the other second actuator 15, 25. Furthermore, each second movable element 152, 252 of a second actuator 15, 25 includes pipes 153, 253 enabling the first actuator 14, 24 of the pressure control module 13, 23 to which the second actuator 15, 25 belongs to be fed at least in part with the fluid feeding the second actuator 15, 25. Nevertheless, the position of the second movable element 152, 252 in a second actuator 15, 25 modifies the fluid flow rate feeding the first actuator 14, 24.

The third forces F3, F'3 of the two second actuators 15, 25 thus serve to modify the flow rate and consequently the pressure of the fluid feeding each first actuator 14, 24. Consequently, each first actuator 14, 24 is fed at least in part with the fluid flowing in the hydraulic circuit 10, 20 to which the first hydraulic actuator 14, 24 belongs via the second actuator 15, 25, and depending on the position of the second movable element 152, 252 of the second actuator 15, 25. A first force F1 is generated by the action of the fluid feeding the first actuator 14, 24 on the first movable element of the first actuator 14, 24.

This force F1, F'1 is thus generated as a function of the pressure $P_{10}$, $P_{20}$ of the fluid flowing in the hydraulic circuit 10, 20 to which the first actuator 14, 24 belongs, and as a function of the third forces F3, F'3. Furthermore, the third forces F3, F'3 are defined as a function of the pressures $P_{10}$, $P_{20}$ of the fluids flowing in each hydraulic circuit 10, 20. As a result, the first force F1, F'1 applied by each first actuator 14, 24 is generated respectively as a function of the pressure $P_{10}$, $P_{20}$ of the fluid flowing in each hydraulic circuit 10, 20.

The second force F2, F'2 of the calibration means 16 of a hydraulic circuit 10, 20 opposes the first force F1, F'1 of the same hydraulic circuit 10, 20 and balances it. Consequently, the position of the first movable element 141, 241 of a first actuator 14, 24 serves to regulate the flow rate of fluid feeding the pressure regulator 18, 28.

Each pressure control module 13, 23 thus serves to regulate the pressure $P_{10}$, $P_{20}$ of the fluid flowing in a hydraulic circuit 10, 20 as a function of the pressures $P_{10}$, $P_{20}$ of the fluid flowing in the two hydraulic circuits 10, 20.

When the pressures $P_{10}$, $P_{20}$ of the fluids flowing in both hydraulic circuits 10, 20 are equal, as shown in FIG. 6, then the third forces F3, F'3 applied to each second movable elements 152, 252 are equal, and the second movable elements 152, 252 have a similar position in each second actuator 15, 25. Consequently, each second actuator 15, 25 feeds a first actuator 14, 24 with all of the flow of fluid flowing in the hydraulic circuit 10, 20 to which the first actuator 14, 24 belongs.

The first forces F1, F'1 generated on respective first movable elements 141, 241 are likewise equal, as are the second forces F2, F'2 generated on respective calibration means 16, 26 and opposing the respective first forces F1, F'1.

Consequently, the position of each first movable element 141, 241 is the same in each hydraulic circuit 10, 20. As a result, the fluid flow rates feeding the pressure regulators 18, 28 are the same, enabling the pressures $P_{20}$, $P_{20}$ of the fluids flowing in the two hydraulic circuits 10, 20 to be regulated on the basis of setpoint pressures $Pc_{10}$, $Pc_{20}$ that are equal.

This operation of the hydraulic circuits 10, 20 with fluid pressures $P_{20}$, $P_{20}$ that are equal is nominal and balanced operation between the two hydraulic circuits 10, 20. These pressures $P_{20}$, $P_{20}$ of the fluid flowing in the two hydraulic circuits 10, 20 are respectively equal to the setpoint pressures $Pc_{10}$, $Pc_{20}$ of the fluids. The setpoint pressures $Pc_{10}$, $Pc_{20}$ are characterized by a calibration setting of each calibration means 16, 26.

Nevertheless, these setpoint pressures $Pc_{10}$, $Pc_{20}$ may be different for each hydraulic circuit 10, 20, in particular when the surface areas $S_{43}$, $S_{44}$ of the pistons 43, 44 arranged in the cylinders 41, 42 are different.

When one of the pressures $P_{10}$, $P_{20}$ decreases, e.g. the second pressure $P_{20}$ as a result of a malfunction of the second hydraulic circuit 20, as shown in FIG. 7, the third force F'3 applied to the second movable element 252 of the second hydraulic circuit 20 and generated by the second pressure $P_{20}$ of the fluid flowing in the second hydraulic circuit 20 decreases. Consequently, the third force F3 applied to the second movable element 152 of the first hydraulic circuit 10 increases, and both second movable elements 152 and 252 move. As a result of these two second movable elements 152, 252 moving, the fluid flow rate feeding the first hydraulic actuator 241 of the second hydraulic circuit 20 remains unchanged, whereas the fluid flow rate feeding the first hydraulic actuator 141 of the first hydraulic circuit 10 is reduced.

The pressure of the fluid feeding the first actuator 241 of the second circuit 20 is thus less than the second setpoint pressure $Pc_{20}$ of the second hydraulic circuit 20. The second pressure regulator 28 thus controls the second variable flow rate pump 27 so as to increase its flow rate in order to cause this second pressure $P_{20}$ of the second hydraulic circuit 20 to increase and approach the second setpoint pressure $Pc_{20}$. If the malfunction of the second hydraulic circuit 20 was temporary, then the second pressure $P_{20}$ of the second hydraulic circuit 20 will increase and become equal once again to the initial second setpoint pressure $Pc_{20}$. If the malfunction of the second hydraulic circuit 20 is permanent, then the second pressure $P_{20}$ cannot increase sufficiently and will remain less than the initial second setpoint pressure $Pc_{20}$ so as to stabilize on a new second setpoint pressure $Pc_{20}$. This second setpoint pressure $Pc_{20}$ may be zero if the malfunction of the second circuit is a major leak or a total failure of the second pump 27.

In parallel, the pressure of the fluid feeding the first actuator 141 of the first circuit 10 is then less than the first pressure $P_{10}$ of the fluid flowing in the first hydraulic circuit 10. The first pressure regulator 18 thus controls the first variable flow rate pump 17 so as to increase its flow rate in order to cause the first pressure $P_{10}$ to increase and compensate for the decrease in the second pressure $P_{20}$. The first pressure $P_{10}$ will then stabilize on a new first setpoint pressure $Pc_{10}$.

Consequently, the increase in the first pressure $P_{10}$ leads to an increase in the third force F3. The positions of the two second movable elements 152, 252 then stabilize so that each hydraulic circuit 10, 20 operates with a new setpoint pressure $Pc_{10}$, $Pc_{20}$.

Advantageously, these new setpoint pressures $Pc_{10}$, $Pc_{20}$ still enable the operating force $F_{SV}$ supplied by the control means 4 to be equal to the fluid force Fc.

In these first and second variants of the first embodiment of the hydraulic power supply device 1, the fluid force Fc is constant and preferably equal to the maximum force that the control means 4 need to be able to supply in its operating range plus a safety margin.

Furthermore, each second hydraulic actuator 15, 25 includes damping means 60 in order to stabilize the operation of the pressure control module 13, 23. The first actuator 14, 24 can also include damping means 60. The damping means 60 may comprise sealing means 61, e.g. a gasket. Such sealing means 61 constitute braking means during movements of the second movable element 152, 252, as shown in FIGS. 6 and 7. Such damping means 60 and sealing means 61 are also shown in FIGS. 3, 5, 10, and 11.

In the second embodiment of this device 1 as shown in FIG. 8, the pressure control module 13, 23 of each hydraulic circuit 10, 20 comprises a hydraulic first actuator 14, 24 fed solely by fluid flowing in the hydraulic circuit 10, 20, calibration means 16, 26, an electric second actuator 15, 25, and control means 155, 255. Each control means 155, 255 supplies an electric signal controlling the operation of a second actuator 15, 25.

The first force F1, F'1 generated by a first actuator 14, 24 thus serves to characterize the pressure of the fluid flowing in the hydraulic circuit 10, 20 to which the first actuator 14, 24 belongs.

The second actuator 15, 25 is controlled to move by an electric signal supplied by the control means 155, 255. The movement of a second actuator 15, 25 acts on the calibration means 16, 26 and modifies its calibration setting.

Consequently, for the same first force F1, F'1 generated by the pressure of the fluid applied to the first movable element 141, 241, the position of the first movable element 141, 241 is modified as a result of a change in the calibration setting of the calibration means 16, 26.

Consequently, the action of the first actuator 14, 24 on a pressure regulator 18, 28 is also modified, thereby having the effect of modifying the setpoint pressure $Pc_{20}$, $Pc_{20}$ of the hydraulic circuit 10, 20.

The second actuator 15, 25 of one hydraulic circuit 10, 20 may be controlled by the pressure of the fluid flowing in the other hydraulic circuit 10, 20 of the device 1. Under such circumstances, each hydraulic circuit 10, 20 has a pressure sensor 156, 256 connected to respective control means 155, 255. Thus, a variation in the first pressure $P_{10}$ of a first hydraulic circuit 10 leads to action of the second actuator 25 of the second circuit 20 modifying the second setpoint pressure $Pc_{20}$ of the second hydraulic circuit 20 so as to compensate for the variation in the first pressure $P_{10}$. In parallel, since the second pressure $P_{20}$ is modified as a result of the modification to the second setpoint pressure $Pc_{20}$, the second actuator 15 of the first hydraulic circuit 10 modifies the first setpoint pressure $Pc_{10}$.

The two hydraulic circuits 10, 20 then stabilize as soon as the pressure $P_{10}$, $P_{20}$ of each hydraulic circuit 10, 20 is equal to the respective new setpoint pressure $Pc_{10}$, $Pc_{20}$.

Advantageously, these new setpoint pressures $Pc_{10}$, $Pc_{20}$ still enable the operating force $F_{SV}$ supplied by the control means 4 to be equal to the fluid force Fc, which is constant and preferably equal to a maximum force that the control means 4 needs to be able to supply in its operating range, plus a safety margin.

The second actuator 15, 25 of a hydraulic circuit 10, 20 may also be controlled by one or more parameters external to the hydraulic circuit 10, circuits 10, 20.

Each control means 155, 255 is connected to a computer 5 of the aircraft 50. The computer 5 receives information about the type of mission being undertaken by the aircraft 50, about the region of its flight envelope in which the aircraft 50 is operating, or indeed about the actions performed by the pilot on each flight control of the aircraft 50. The computer 5 can then define the setpoint force Fc that is necessary and sufficient for controlling changes to the pitch of the main blades 54. Finally, the computer 5 can supply a signal to each of the control means 155, 255 corresponding to new setpoint pressures $Pc_{10}$, $Pc_{20}$ that correspond to this setpoint force Fc. Each of the control means 155, 255 then supplies a second actuator 15, 25 with a movement order so as to modify each of the setpoint pressures $Pc_{10}$, $Pc_{20}$.

Advantageously, the fluid force Fc is then variable and equal to a current force that the control means 4 needs to be capable of supplying, plus a safety margin. Consequently, the setpoint pressures $Pc_{10}$, $Pc_{20}$ are also variable and they adapt to the current requirements of the aircraft 50. Consequently, the pressure of each hydraulic circuit 10, 20 is regulated so that the control means 4 provide hydraulic power that is just sufficient for the needs of the aircraft 50, thereby optimizing its energy consumption.

Each of the control means 155, 255 is also connected to action means 7, such as a switch, that the pilot can actuate when the pilot desires to benefit from additional hydraulic power from the control means 4. Thus, when the pilot actuates the action means 7, each of the control means 155, 255 supplies a second actuator 15, 25 with a movement order so as to increase each of the setpoint pressures $Pc_{10}$, $Pc_{20}$. The fluid force Fc is increased, and the pilot has greater hydraulic power available for changing the pitch of the main blades 54, e.g. in anticipation of a drop of fluid pressure in a hydraulic circuit 10, 20 during landing under difficult conditions, or indeed during a winching operation.

The third embodiment of the hydraulic power supply device 1 shown in FIG. 9 combines the first and second embodiments. The pressure control module 13, 23 of each hydraulic circuit 10, 20 comprises a first actuator 14, 24 that is hydraulic, calibration means 16, 26, a first second actuator 15, 25 that is hydraulic, a second second actuator 15', 25' that is electric, and control means 155, 255.

The first hydraulic actuator 14, 24, the hydraulic first second actuator 15, 25, and the calibration means 16, 26 are identical to those of the second example of the first variant of the first embodiment of the invention as shown in FIGS. 4 and 5.

The electric second second actuator 15', 25' is identical to the second actuator of the second embodiment shown in FIG. 8. Each control means 155, 255 supplies an electric signal controlling the operation of a second second actuator 15', 25'.

Thus, each first second actuator 15, 25 enables the setpoint pressure $Pc_{10}$, $Pc_{20}$ of a first hydraulic circuit 10, 20 to be adapted as a function of the pressure of the fluid flowing in the second hydraulic circuit 10, 20 as in the second example of the first variant of the first embodiment. The fluid force Fc is constant.

Furthermore, each second second actuator 15', 25' enables the setpoint pressure $Pc_{10}$, $Pc_{20}$ of a hydraulic circuit 10, 20 to be adapted as a function of one or more parameters external to the hydraulic circuits 10, 20, such as the type of mission being undertaken by the aircraft 50, the region of its flight envelope in which the aircraft 50 is operating, or indeed an action carried out by the pilot on a flight control of the aircraft 50, as for the second embodiment.

This third embodiment serves advantageously to dissociate firstly a first second actuator 15, 25 that is hydraulic for modifying the setpoint pressure $Pc_{10}$, $Pc_{20}$ of each hydraulic circuit 10, 20 depending on the operation of each hydraulic circuit 10, 20 so as to enable the control means 4 to supply a fluid force Fc that is constant, from secondly a second second actuator 15', 25' that is electric for modifying the setpoint pressures $Pc_{10}$, $Pc_{20}$ of each hydraulic circuit 10, 20 depending on one or more parameters, enabling the control means 4 to supply a fluid force Fc that is variable and adapted to the current situation of the aircraft 50.

Figure 10:
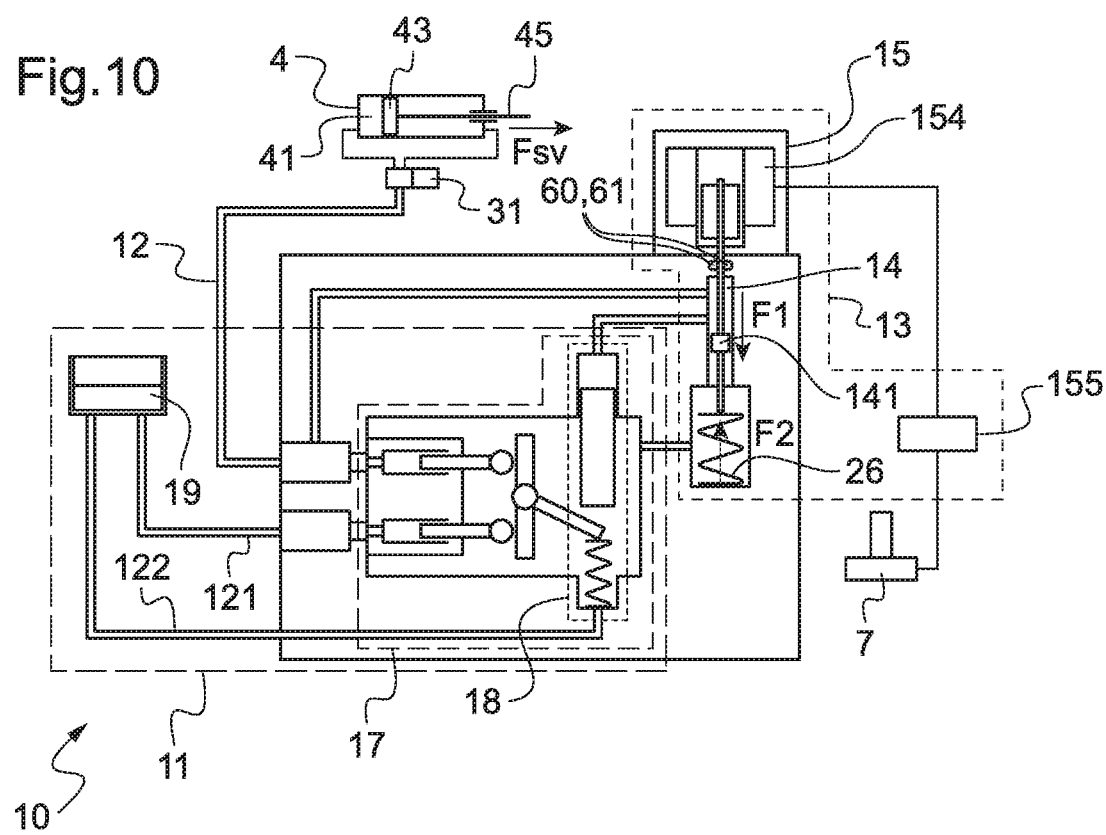
FIGS. 10 and 11 show a hydraulic circuit of the invention.
Figure 11:
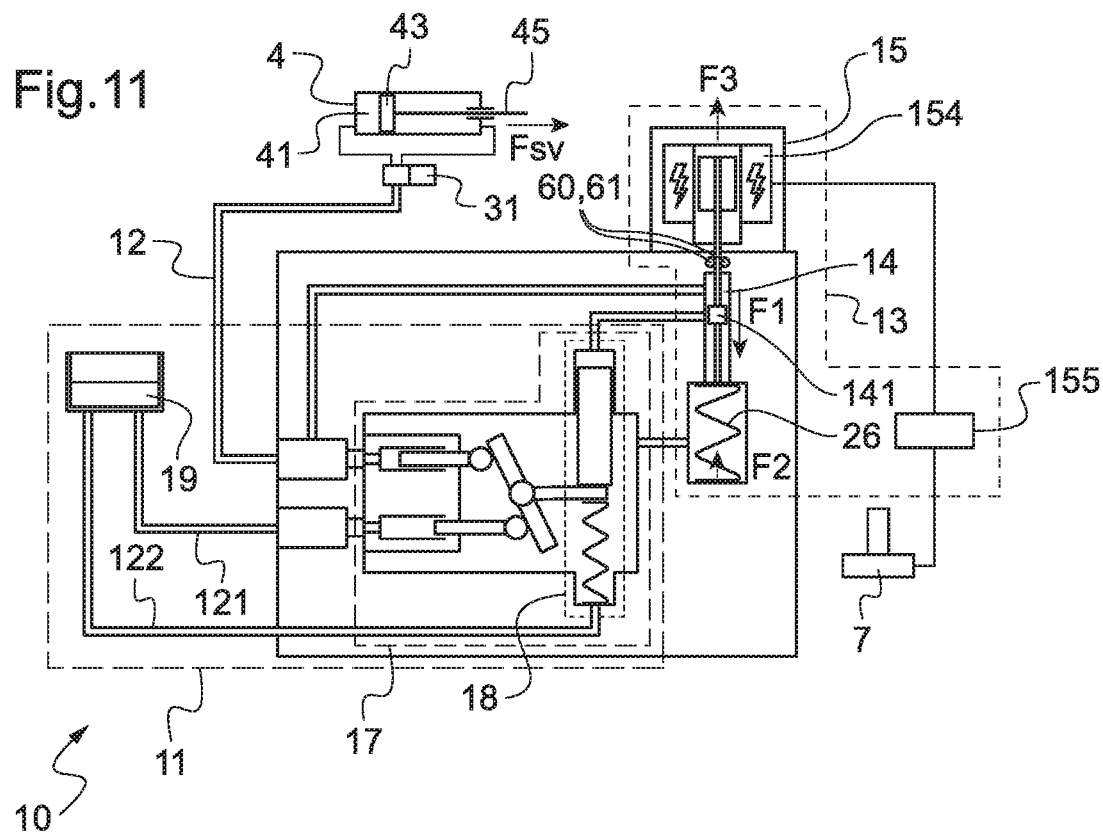

Furthermore, a hydraulic receiver 3 can be fed by a single hydraulic circuit 10 as shown in FIGS. 10 and 11. The hydraulic circuit 10 comprises a generator 11 of hydraulic pressure and flow rate in a fluid, pipes 12, and a pressure control module 13. The pipes 12 connect the hydraulic pressure and flow rate generator 11 with the hydraulic receiver 3, and they feed it with fluid under pressure.

The hydraulic receiver 3 includes control means 4 and a valve 31 controlling the feed of fluid from the control means 4 as a function of a control order. By way of example, this control order comes from a flight control present in the aircraft 50 and operated by a pilot in order to modify the pitch of the main blades 54 of the main rotor 52.

The control means 4 can cause the pitch of the main blades 54 to be modified by applying an operating force $F_{SV}$ via the rod 45. This operating force $F_{SV}$ is equal to a setpoint force Fc so as to guarantee that this operating force $F_{SV}$ is greater than or equal to the force needed for modifying the pitch of the main blades 54. Consequently, a setpoint pressure $Pc_{10}$ of the fluid flowing in the hydraulic circuit 10 is determined as a function of the setpoint force Fc that the control means 4 need to supply and of the surface area $S_{43}$ of the piston 43 arranged in the control means 4.

As in each hydraulic circuit 10, 20 shown in FIGS. 6 to 9, the hydraulic pressure and flow rate generator 11 comprises a tank 19 containing the fluid, a variable flow rate pump 17 of flow rate that is automatically regulated, and provided with a pressure regulator 18, together with feed pipes 121, and tank return pipes 122. The pressure control module 13 controls the pressure regulator 18 so as to adapt the flow rate of the variable flow rate pump 17 and thus regulate the pressure $P_{10}$ of the fluid flowing in the hydraulic circuit 10 depending on the initial setpoint pressure $Pc_{10}$.

The pressure control module 13 of the hydraulic circuit 10 comprises a first actuator 14 that is hydraulic and controlled by the pressure of the fluid flowing in the hydraulic circuit 10, a second actuator 15 that is electric and that is controlled by control means 155, and calibration means 16.

The hydraulic first actuator 14 has a first movable element 141 on which the pressure of the fluid flowing in the hydraulic circuit 10 is applied. A first force F1 is thus generated on this first movable element 141. A second force F2 generated by the calibration means 16 opposes this first force F1. The calibration means 16 comprises resilient means constituted by a spring working in compression.

The control means 155 is connected to action means 7, such as a switch actuatable by the pilot when the pilot desires to benefit from additional hydraulic power from the control means 4. The second actuator 15 comprises a ferromagnetic element 154 secured to the first movable element 141. When the second actuator 15 is electrically powered, it delivers a magnetic field causing a third force F3 to appear on the ferromagnetic element 154 so as to move the first movable element 141.

Thus, when the pilot does not actuate the action means 7, the third force F3 is zero, as shown in FIG. 10. Consequently, only the first and second forces F1, F2 are applied to the first movable element 141. As a result, the pressure regulator 18 acts to regulate the pressure $P_{10}$ of the fluid flowing in the hydraulic circuit 10 on the initial setpoint pressure $Pc_{10}$, this initial setpoint pressure $Pc_{10}$ being a function of the calibration setting of the calibration means 16.

Thereafter, when the pilot actuates the action means 7, as shown in FIG. 11, the control means 155 electrically powers the second actuator 15 so as to generate the magnetic field and moves the first movable element 141. This movement of the first movable element 141 causes the setpoint pressure $Pc_{10}$ to increase. The fluid force Fc is also increased and the pilot has greater hydraulic power available for changing the pitch of the main blades 54, thus anticipating a maneuver with high power requirements. When the pressure $P_{10}$ of the fluid flowing in the hydraulic circuit 10 increases so as to come close to the new setpoint pressure $Pc_{10}$, the first force F1 increases and the movable element 141 moves so that the pressure regulator 18 stabilizes the pressure of the fluid flowing in the hydraulic circuit 10 to a level of this new setpoint pressure $Pc_{10}$.

Finally, when the pilot deactivates the second actuator 15 by acting once more on the action means 7, the first movable element 141 is no longer subjected to the third force F3 and is moved only under the effect of the pressure of the fluid flowing in the first circuit 10, which generates the first force F1, and the second force F2 as generated by the calibration means 16. The setpoint pressure $Pc_{10}$ is modified and returns to its initial value. The pressure $P_{10}$ of the fluid flowing in the first circuit 10 decreases until it stabilizes on the initial setpoint pressure $Pc_{10}$. The fluid force Fc is also modified to return to its initial value.

The second actuator 15 then supplies a force F3 which is either zero when the second actuator 15 is deactivated, or else equal to a predefined value when the second actuator 15 is activated. Consequently, the setpoint force Fc is variable, but can only take on two different values: a first fluid force Fc1 corresponding to nominal operation of the aircraft, and a second fluid force Fc2 corresponding to operation with "temporary extra power" for enabling the pilot of the aircraft 50 to act safely when performing maneuvers having greater power requirements, such as hovering or landing on a platform under difficult weather conditions, for example.

It should be observed that whatever the embodiment of the hydraulic power supply device 1 provided with two hydraulic circuits 10, 20, the two hydraulic circuits 10, 20 may be identical or they may be different. Likewise, the cylinders 41, 42 of multi-cylinder control means 4 may be identical or indeed different.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A hydraulic circuit for feeding at least one hydraulic receiver, the hydraulic circuit comprising:
   a fluid;
   a hydraulic pressure and flow rate generator capable of generating hydraulic pressure and flow rate in the fluid;
   pipes connecting the hydraulic pressure and flow rate generator with the hydraulic receiver; and
   a pressure control module controlling the hydraulic pressure and flow rate generator to regulate the pressure of the fluid flowing in the hydraulic circuit as a function of the pressure of the fluid flowing in the hydraulic circuit and of one or more parameters external to the hydraulic circuit so that a pressure of the fluid flowing in the hydraulic circuit is equal to a setpoint pressure;
   wherein the pressure control module comprises a first actuator that is hydraulic and controlled at least in part as a function of the pressure of the fluid flowing in the hydraulic circuit, at least one second actuator that is controlled by one or more parameters external to the hydraulic circuit, and calibration means,
   wherein each second actuator includes braking and damping means for stabilizing the operation of the pressure control mode.

2. The hydraulic circuit according to claim 1, wherein the hydraulic first actuator has a first movable element on which the pressure of the fluid flowing in the hydraulic circuit is applied at least in part in order to generate a first force F1 balanced by a second force F2 generated by the calibration means, each second actuator enabling the setpoint pressure to be modified.

3. The hydraulic circuit according to claim 1, wherein the at least one second actuator modifies the calibration setting of the calibration means.

4. The hydraulic circuit according to claim 1, wherein the at least one second actuator generates a third force F3 and drives movement of the first movable element of the first actuator.

5. The hydraulic circuit according to claim 1, wherein the at least one second actuator is a hydraulic actuator fed by a second fluid external to the hydraulic circuit, the at least one second actuator being connected to a hydraulic system external to the hydraulic circuit by a pipe of the hydraulic circuit in which there flows the fluid external to the hydraulic circuit.

6. The hydraulic circuit according to claim 1, wherein the at least one second actuator is an electric actuator controlled by a control signal corresponding to the one or more parameters external to the hydraulic circuit, the hydraulic circuit having an electrical connection connecting the at least one second actuator to a control device external to the hydraulic circuit and in which the control signal passes.

7. The hydraulic circuit according to claim 1, wherein the at least one second actuator is movement controlled.

8. The hydraulic circuit according to claim 1, wherein the at least one second actuator is force controlled.

9. The hydraulic circuit according to claim 1, wherein the calibration means comprise resilient means.

10. A hydraulic power supply device comprising at least one hydraulic receiver and at least two hydraulic circuits, the hydraulic circuits jointly feeding the hydraulic receiver with fluid under pressure, wherein each hydraulic circuit is a circuit according to claim 1.

11. The device according to claim 10, wherein the hydraulic receiver includes multi-cylinder hydraulic power transmission means comprising a plurality of cylinders, each cylinder of the hydraulic power transmission means being connected to a single hydraulic circuit independently of every other hydraulic circuit, the pressure of the fluid flowing in each hydraulic circuit acting on a respective one of the cylinders, the hydraulic power transmission means being capable of supplying an operating force as a function of the pressures of the hydraulic circuits and equal to a setpoint force Fc, the setpoint pressure of each hydraulic circuit being defined as a function of the setpoint force Fc.

12. The device according to claim 10, wherein the hydraulic circuits are segregated both hydraulically and mechanically, firstly so as to prevent any exchange of fluid between the hydraulic circuits, and secondly so that the hydraulic circuits are structurally distinct.

13. The device according to claim 10, wherein a second hydraulic actuator of a first hydraulic circuit includes braking and damping means, and the braking and damping means characterize a pressure threshold applied to a second pressure of a second fluid flowing in a second hydraulic circuit and feeding the second actuator so as limit the effects of the second actuator on the modification of the setpoint pressure of the first fluid flowing in the first hydraulic circuit.

14. The hydraulic circuit according to claim 1, wherein the hydraulic first actuator has a first movable element on which the pressure of the fluid flowing in the hydraulic circuit is applied at least in part in order to generate a first force F1 balanced by a second force F2 generated by the calibration means, each second actuator enabling the setpoint pressure to be modified.

15. The hydraulic circuit according to claim 1, wherein the at least one second actuator modifies the calibration setting of the calibration means.

16. The hydraulic circuit according to claim 1, wherein the at least one second actuator generates a third force F3 and drives movement of the first movable element of the first actuator.

17. The hydraulic circuit according to claim 1, wherein the one or more parameters external to the hydraulic circuit is selected from a list comprising:
a second pressure of a second fluid flowing in another hydraulic circuit;
an operating characteristic of a hydraulic receiver fed by the hydraulic circuit; and
an order to modify the setpoint pressure.

18. A hydraulic power supply device comprising at least one hydraulic receiver and at least two hydraulic circuits, the hydraulic circuits jointly feeding the hydraulic receiver with fluid under pressure, the hydraulic receiver including multi-cylinder hydraulic power transmission means, wherein the hydraulic power transmission means comprise control means for controlling a movable airfoil element of an aircraft, and a parameter external to a first hydraulic circuit is selected from the list comprising:
a second pressure of a second fluid flowing in a second hydraulic circuit of the hydraulic power supply device;
a type of mission being undertaken by the aircraft;
a region of a flight envelope of the aircraft;
an action of a pilot of the aircraft on a flight control of the aircraft;
a control order from the pilot seeking to modify the setpoint pressure of the first fluid flowing in the first hydraulic circuit; and
a parameter external to the aircraft and likely to vary, and
wherein each hydraulic circuit comprises:
a fluid;
a hydraulic pressure and flow rate generator for generating hydraulic pressure and flow rate in the fluid;
pipes for connecting the hydraulic pressure and flow rate generator with the hydraulic receiver; and
a pressure control module controlling the hydraulic pressure and flow rate generator to regulate the pressure of the fluid flowing in the hydraulic circuit as a function of the pressure of the fluid flowing in the hydraulic circuit and of one or more parameters external to the hydraulic circuit so that a pressure of the fluid flowing in the hydraulic circuit is equal to a setpoint pressure;
wherein the pressure control module comprises a first actuator that is hydraulic and controlled at least in part as a function of the pressure of the fluid flowing in the hydraulic circuit, at least one second actuator that is controlled by one or more parameters external to the hydraulic circuit, and calibration means.

19. The device according to claim 18, wherein the multi-cylinder hydraulic power transmission means comprises a plurality of cylinders, each cylinder of the hydraulic power transmission means being connected to a single hydraulic circuit independently of every other hydraulic circuit, the pressure of the fluid flowing in each hydraulic circuit acting on a respective one of the cylinders, the hydraulic power transmission means being capable of supplying an operating force as a function of the pressures of the hydraulic circuits and equal to a setpoint force Fc, the setpoint pressure of each hydraulic circuit being defined as a function of the setpoint force Fc.

20. A hydraulic circuit for feeding at least one hydraulic receiver, the hydraulic circuit comprising:
a hydraulic pressure and flow rate generator capable of generating hydraulic pressure and flow rate;
pipes connecting the hydraulic pressure and flow rate generator with the hydraulic receiver; and
a pressure control module capable of controlling the hydraulic pressure and flow rate generator to regulate the pressure of fluid flowing in the hydraulic circuit as a function of the pressure of the fluid flowing in the hydraulic circuit and of one or more parameters external to the hydraulic circuit so that a pressure of the fluid flowing in the hydraulic circuit is equal to a setpoint pressure;
wherein the pressure control module comprises a first actuator that is hydraulic and controllable at least in part as a function of the pressure of fluid flowing in the hydraulic circuit, at least one second actuator that is controllable by one or more parameters external to the hydraulic circuit, and calibration means,
wherein each second actuator includes a damper for stabilizing the operation of the pressure control mode.

* * * * *